US012795704B2

(12) United States Patent
Abdelghaffar et al.

(10) Patent No.: US 12,795,704 B2
(45) Date of Patent: Nov. 10, 2026

(54) ORPHAN RESOURCE ELEMENT (RE) FOR DEMODULATION REFERENCE SIGNALS (DMRS) IN SUB-BAND FULL DUPLEX (SBFD)

(71) Applicant: QUALCOMM Incorporated, San Diego, CA (US)

(72) Inventors: Muhammad Sayed Khairy Abdelghaffar, San Jose, CA (US); Yi Huang, San Diego, CA (US); Jae Won Yoo, San Diego, CA (US); Jae Ho Ryu, San Diego, CA (US); James Beckman, La Jolla, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/418,686

(22) Filed: Jan. 22, 2024

(65) Prior Publication Data

US 2025/0240803 A1 Jul. 24, 2025

(51) Int. Cl.
*H04W 72/51* (2023.01)
*H04L 5/14* (2006.01)
*H04W 72/12* (2023.01)

(52) U.S. Cl.
CPC ............... *H04W 72/51* (2023.01); *H04L 5/14* (2013.01); *H04W 72/12* (2013.01)

(58) Field of Classification Search
CPC .......... H04W 72/51; H04W 72/12; H04L 5/14
See application file for complete search history.

(56) References Cited

U.S. PATENT DOCUMENTS

2021/0400637 A1* 12/2021 Abotabl .................... H04L 5/14
2024/0259246 A1* 8/2024 Hamidi-Sepehr ..... H04L 27/265
2025/0193911 A1* 6/2025 Jang ...................... H04W 72/21
2025/0247187 A1* 7/2025 Muruganathan ...... H04L 5/0051
2025/0274249 A1* 8/2025 Lu ......................... H04L 5/0094

* cited by examiner

*Primary Examiner* — Brian J. Gillis
*Assistant Examiner* — Chhian (Amy) Ling
(74) *Attorney, Agent, or Firm* — Patterson & Sheridan LLP

(57) ABSTRACT

Certain aspects of the present disclosure provide a method for wireless communications at a gNodeB (gNB). The gNB may receive capability information of a user equipment (UE). The gNB may transmit an indication of scheduled resources for one or more transmissions to the UE. The scheduled resources may be in accordance with scheduling rules, which are associated with the capability information. The scheduling rules may indicate a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, and/or a size of each physical resource block group (PRG) allocated for the UE is associated with an even number.

20 Claims, 19 Drawing Sheets

800

| gNB | UE | Comments |
|---|---|---|
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

FIG. 8

ORPHAN RESOURCE ELEMENT (RE) FOR DEMODULATION REFERENCE SIGNALS (DMRS) IN SUB-BAND FULL DUPLEX (SBFD)

BACKGROUND

Field of the Disclosure

Aspects of the present disclosure relate to wireless communications, and more particularly, to techniques for managing scheduling of resources for a sub-band full duplex (SBFD)-aware user equipment (UE).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes outputting capability information of the UE; and obtaining an indication of scheduled resources for one or more transmissions, wherein the scheduled resources are in accordance with one or more scheduling rules associated with the capability information, and wherein the one or more scheduling rules indicate at least one of: a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, or a size of each physical resource block group (PRG) allocated for the UE is associated with an even number.

Another aspect provides a method for wireless communications at a network entity. The method includes obtaining capability information of a UE; and outputting an indication of scheduled resources for one or more transmissions, wherein the scheduled resources are in accordance with one or more scheduling rules associated with the capability information, and wherein the one or more scheduling rules indicate at least one of: a same quantity of consecutive PRBs to be allocated for each downlink sub-band within a downlink BWP, a quantity of PRBs that are at an offset from a reference point per each downlink sub-band within the downlink BWP is even, or a size of each PRG allocated for the UE is associated with an even number.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5, FIG. 6, FIG. 7, and FIG. 8 depict different use cases for full-duplex (FD) communications.

DETAILED DESCRIPTION

Figure 1:
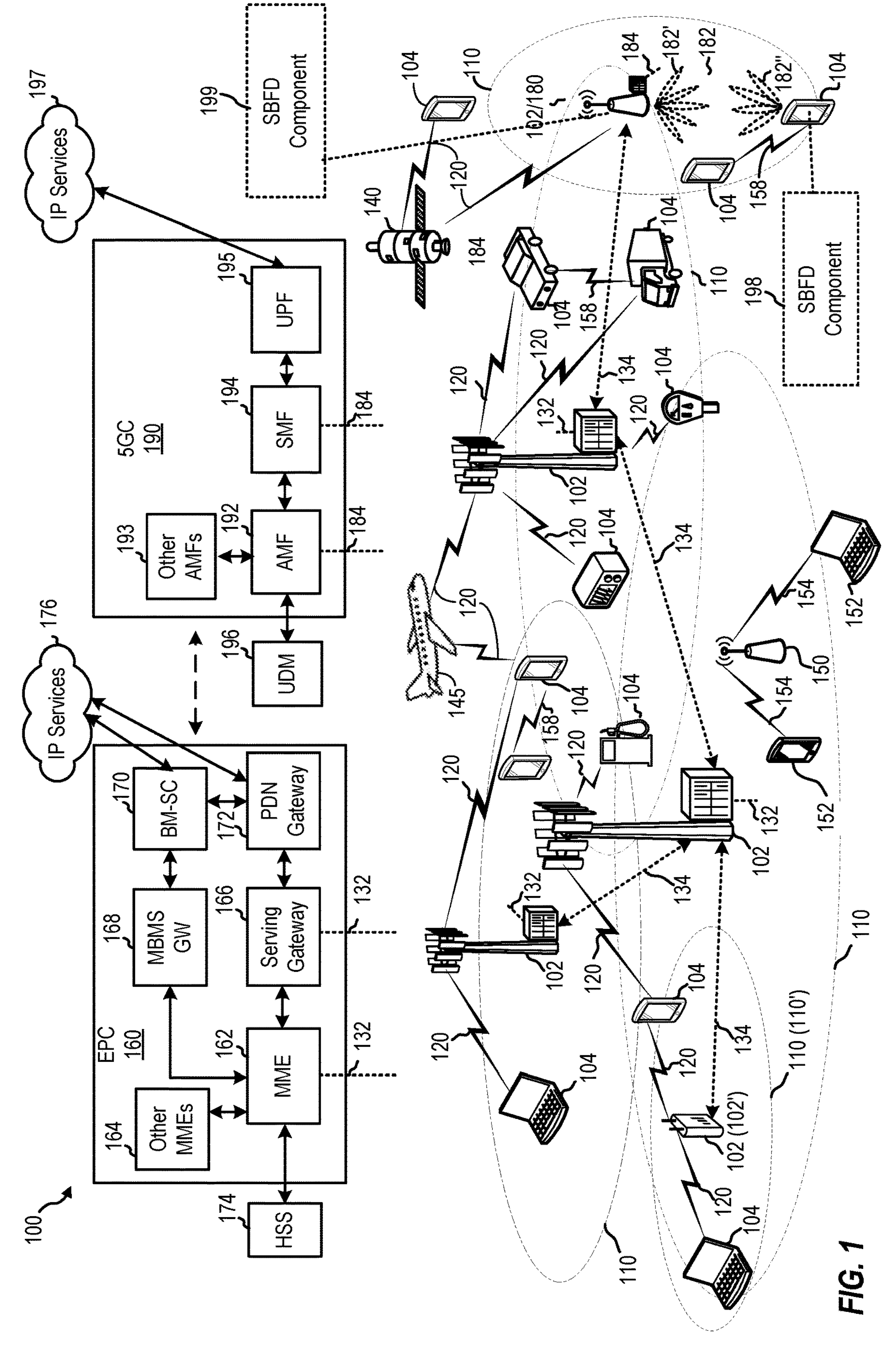
FIG. 1 depicts an example wireless communications network.

Aspects of the present disclosure provide apparatuses, methods, processing systems, and computer-readable mediums for managing scheduling of resources for a sub-band full duplex (SBFD)-aware wireless node.

Full duplex (FD) communication refers to a mode of communication where signals can be transmitted and received simultaneously over a single communication channel. For example, in FD mode, simultaneous transmission between wireless nodes (e.g., user equipment (UE) s, a gNodeBs (gNBs)) may occur. In a half-duplex (HD) mode, communication flows in one direction at a time. SBFD refers to a mode where a time division duplex (TDD) carrier is split into sub-bands to enable simultaneous transmission and reception (e.g., on different sub-bands) in a same slot that consists of multiple symbols.

In some cases, a size (e.g., a nominal size) of physical resource block group (PRG) may be determined or configured to be two or four. For some PRG(s) which may not fully overlap with UE downlink bandwidth part (BWP), downlink sub-band, or uplink sub-band, only a subset of physical resource blocks (PRBs) within the PRG is used. Such PRGs may be called as partial PRGs.

In some cases, an even number of resource elements (REs) in a frequency domain may be required for a transmission. For example, the transmission with two transmit antenna ports may require two REs in the frequency domain, while four transmit antenna ports may require four REs in the frequency domain. The even number of REs may be grouped together into groups of two, which may be referred to as paired REs. However, in some orthogonal frequency division multiplexed (OFDM) symbols, some REs may already be dedicated for other data types (e.g., for demodulation reference signals (DMRS) data), and are not available for the transmission. If there is an odd number of REs in the OFDM symbol remaining for the transmission, then at least one of the REs may not be usable for the transmission. The REs unusable for the transmission may be referred to as orphan REs.

In some cases, a first wireless node (e.g., a UE) may be configured for the HD operation. The UE may also be configured with a time resource and/or a frequency location associated with an SBFD duplexing scheme at a second wireless node (e.g., a gNB) (i.e., the UE may be the SBFD-aware UE). In such cases, the UE may be associated with some scenarios, which may result in the orphan REs and thus inefficient use of a limited number of resources. In one example scenario, multiple segments of PRBs allocated for the SBFD-aware UE may have an odd number of PRBs, which may result in some orphan REs.

Techniques described herein may enable a gNB to implement one or more scheduling restrictions for scheduling resources for an SBFD-aware UE, which may not support the use of orphan REs. For example, for the SBFD-aware UE scheduled with one or more partial PRGs per downlink sub-band within a UE downlink BWP, if the UE does not support an orphan RE capability, the gNB may have applied the scheduling restrictions to ensure that a number of each consecutive set of PRBs per each downlink sub-band is even.

Particular aspects of the subject matter described in this disclosure can be implemented to realize one or more of the following potential advantages. In some examples, the described techniques may lead to the efficient use of the resources for the transmissions as no resource is wasted or is unused.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
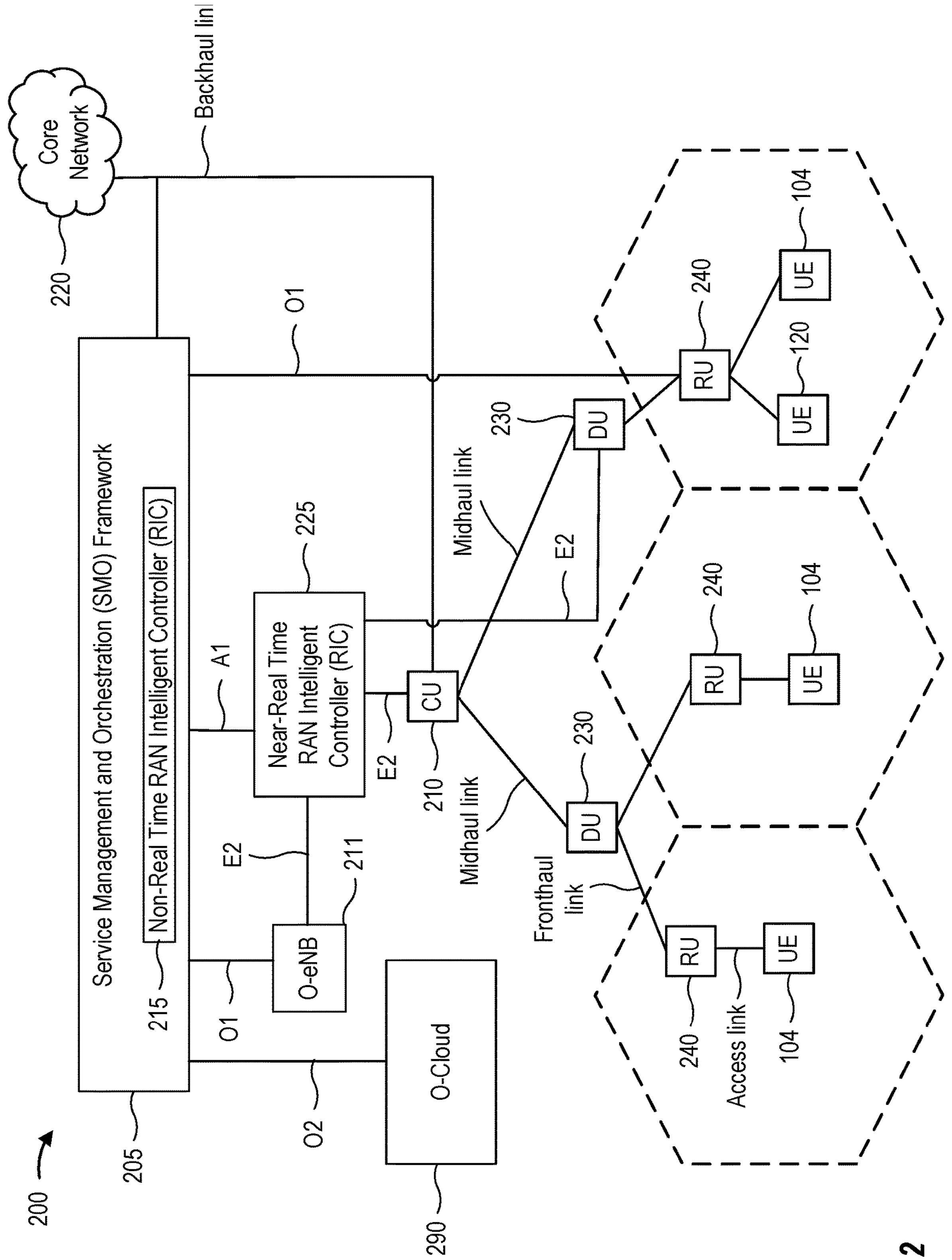
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 130) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as “Sub-6 GHz”. Similarly, 3GPP currently defines Frequency Range 2 (FR2) as including 26-41 GHz, which is sometimes referred to (interchangeably) as a “millimeter wave” (“mmW” or “mmWave”). A BS configured to communicate using mm Wave/near mm Wave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 16:
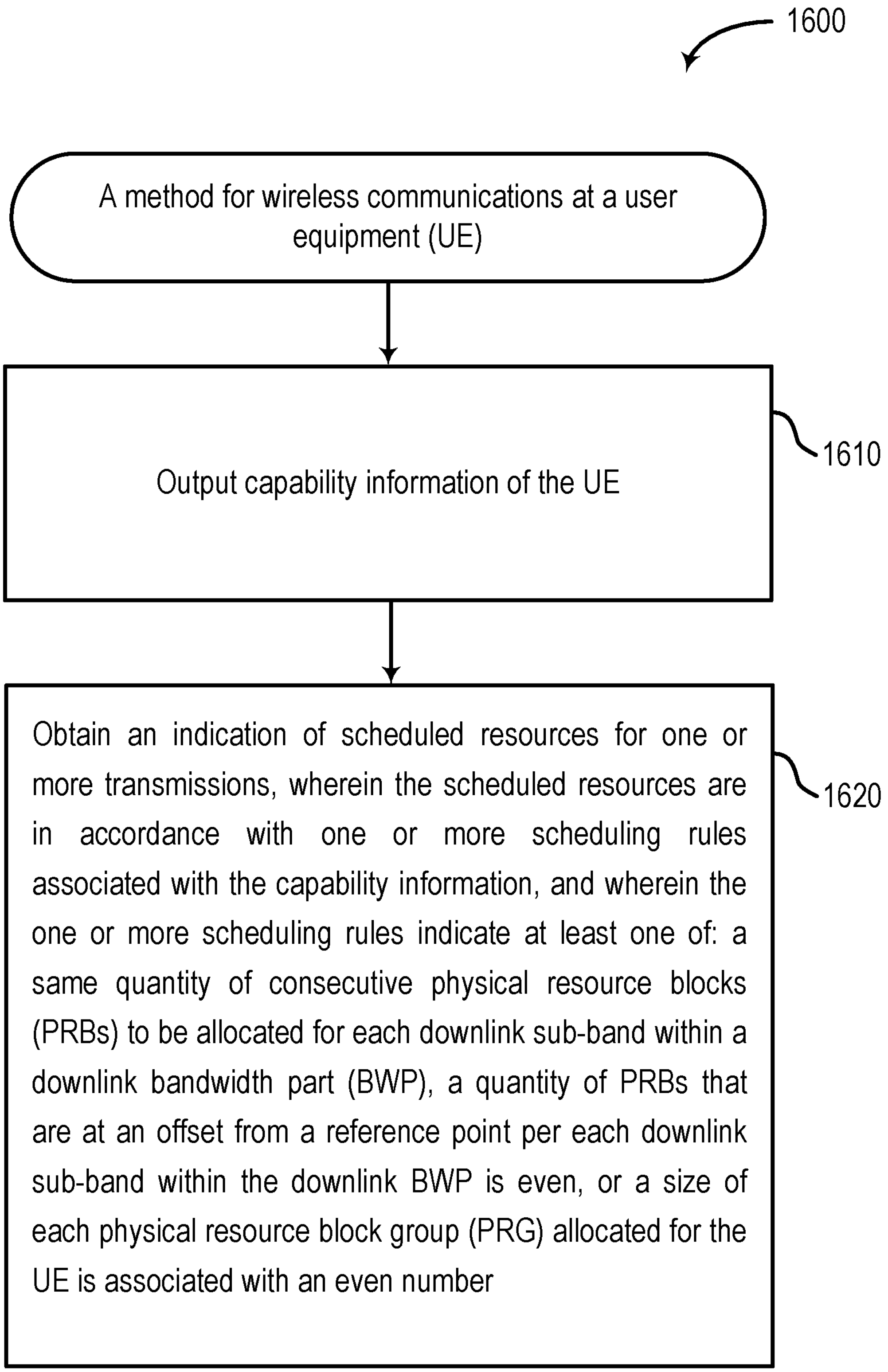
FIG. 16 depicts a method for wireless communications at a wireless node such as a UE.

Wireless communication network 100 further includes sub-band full duplex (SBFD) component 198, which may be configured to perform method 1600 of FIG. 16. Wireless communication network 100 further includes SBFD component 199, which may be configured to perform method 1700 of FIG. 17.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
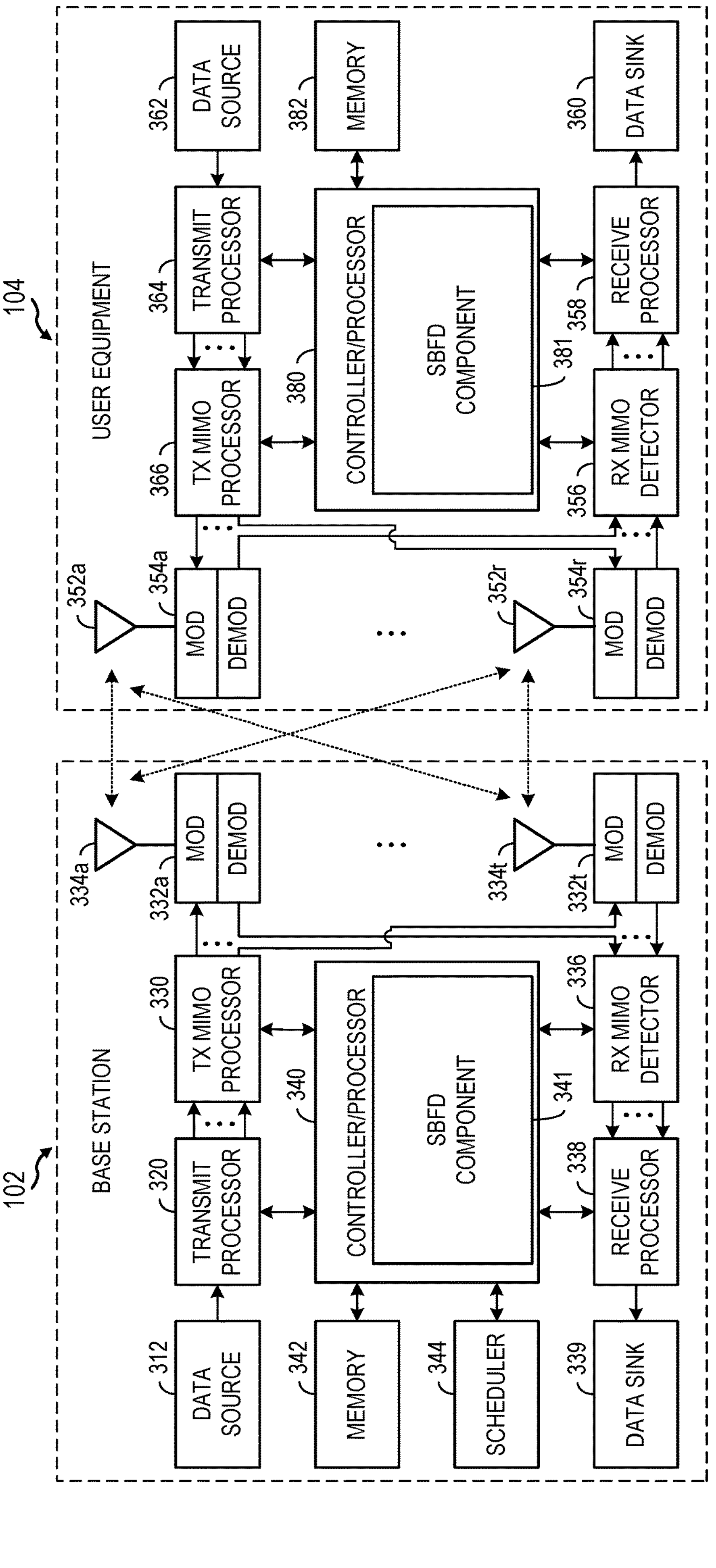
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes SBFD component 341, which may be representative of SBFD component 199 of FIG. 1. Notably, while depicted as an aspect of controller/processor 340, SBFD component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes SBFD component 381, which may be representative of SBFD component 138 of FIG. 1. Notably, while depicted as an aspect of controller/processor 380, SBFD component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting"

may refer to various mechanisms of providing or outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4B:
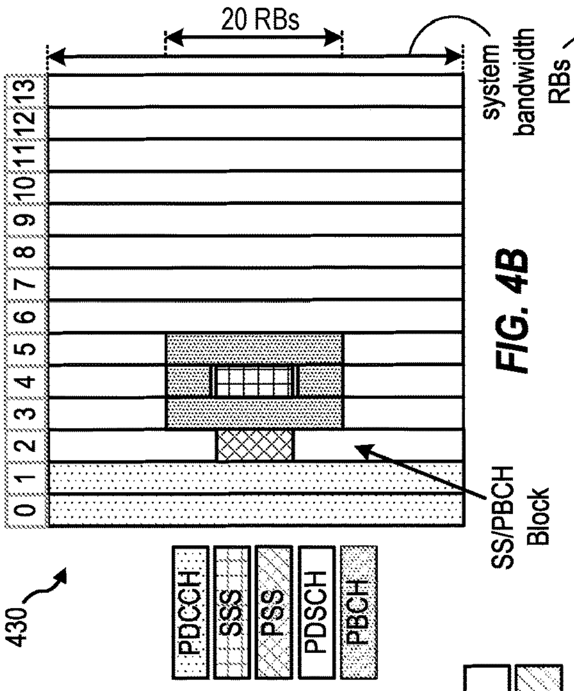
FIG. 4A, FIG. 4B, FIG. 4C, and FIG. 4D depict various example aspects of data structures for a wireless communications network.
Figure 4A:
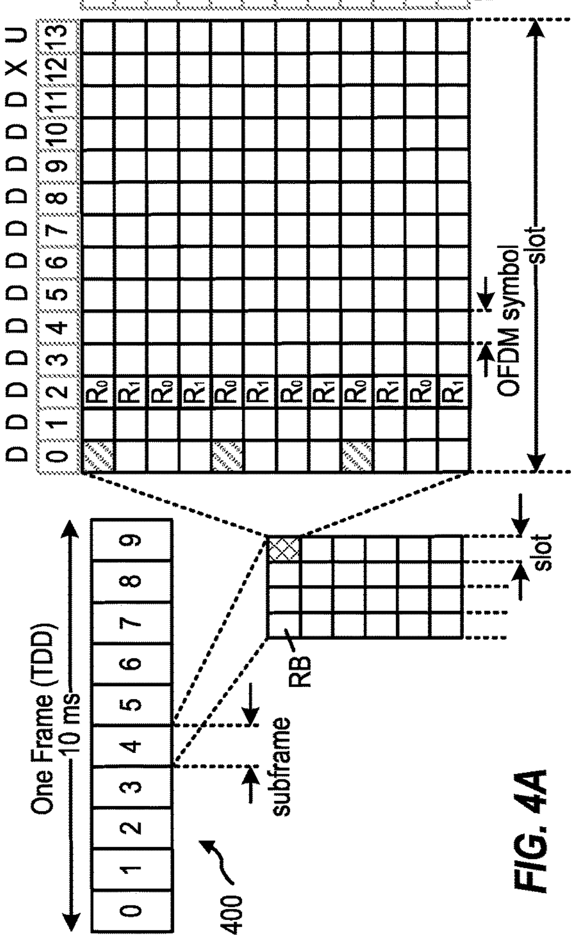
Figure 4D:
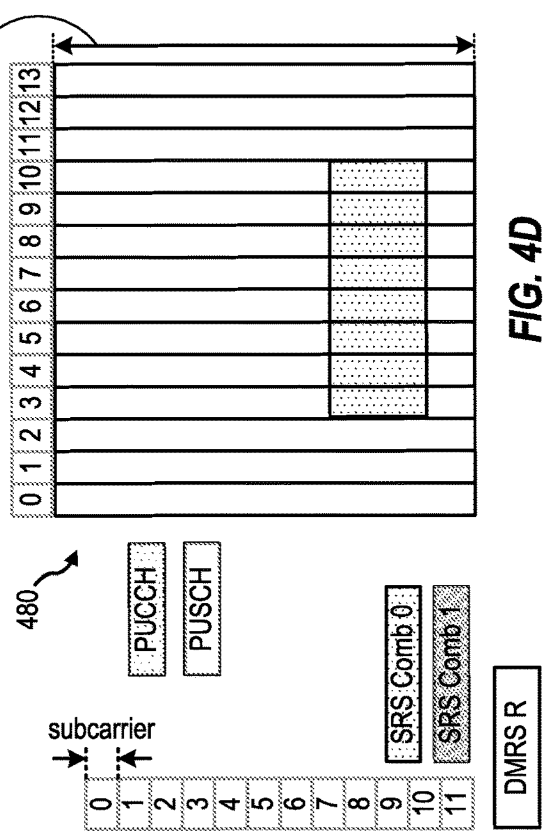
Figure 4C:
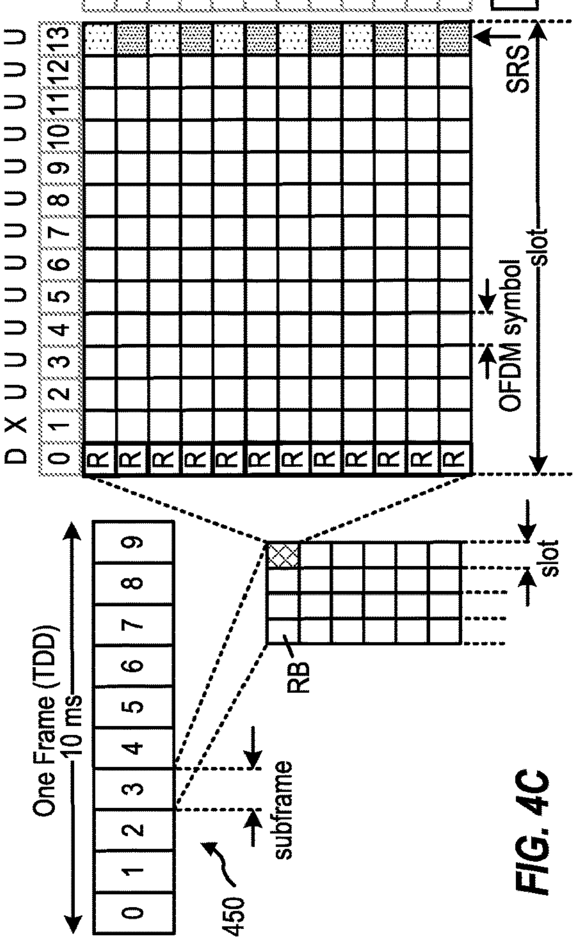

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 82 s.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as $3^{rd}$ generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mmWave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mm Wave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Multiple-Input Multiple-Output (MIMO) Systems

Multiple-input multiple-output (MIMO) is a multi-antenna technology that exploits multipath signal propagation so that information-carrying capacity of a wireless link can be multiplied by using multiple antennas at a transmitter node and a receiver node to send multiple simultaneous streams. At a multi-antenna transmitter node, a precoding technique (e.g., scaling the respective streams' amplitude and phase) is applied (e.g., based on known channel state information (CSI)). At a multi-antenna receiver node, the different spatial signatures of the respective streams (e.g., known CSI) can enable the separation of these streams from one another.

For example, a network entity (e.g., a gNodeB (gNB)) may include multiple antennas supporting MIMO technology. The use of MIMO technology enables the network entity to exploit spatial domain to support spatial multiplexing, beamforming, and transmit diversity. The spatial multiplexing may be used to transmit different streams of data simultaneously on a same frequency. The data steams may be transmitted to a single user equipment (UE) to increase a data rate or to multiple UEs to increase overall system capacity. This is achieved by spatially precoding each data stream (i.e., applying a scaling of an amplitude and a phase) and then transmitting each spatially precoded stream through multiple transmit antennas on a downlink. The spatially precoded data streams arrive at the UEs with different spatial signatures, which enables each of the UEs to recover the one or more data streams destined for that UE. On uplink, each UE transmits a spatially precoded data stream, which enables the network entity to identify the source of each spatially precoded data stream.

The performance of a MIMO system is related to a received signal-to-interference-and-noise ratio (SINR) and correlation properties of a multipath channel and antenna configuration. Using precoding techniques, the MIMO system can increase and/or equalize the received SINR across the multiple receive antennas. The transmitter node can utilize a plurality of complex weighting precoding matrices to precode the streams of a MIMO channel. The precoding matrices can be defined in a codebook where each precoding matrix can be identified by a precoding matrix index (PMI). When the codebook is known to both the transmitter node and the receiver node, the receiver node can inform the transmitter node to use a certain precoding matrix by sending the PMI of the desired precoding matrix to the transmitter node.

In new radio (NR) uplink, a UE can support up to 32 transmit (Tx) antennas, while the gNB can support up to 1024 receive (Rx) antennas. So, fine beamforming can be implemented on both the UE-Tx end and the BS-Rx end. With the significant increase in a number of antennas, an uplink MIMO gain of NR is much greater, including beamforming gain and multiplexing gain. However, since the achievable gain also depends on the design of the transmission technology, a closed loop-MIMO may be a preferred choice in the transmission scheme for uplink data channels. When an open-loop MIMO is used in uplink transmissions, benefits of increasing the number of antennas are limited. A semi-open-loop MIMO may be used in scenarios where accurate CSI cannot be obtained, such as UE movement, rotation, and partial channel reciprocity. In some cases, the open loop MIMO may allow the UE to report a rank indicator (RI) and channel quality indicator (CQI), while the closed loop MIMO may allow the UE to report RI, CQI and PMI.

MU-MIMO stands for multi-user, multiple input, multiple output, and represents a significant advance over single-user MIMO (SU-MIMO), which is generally referred to as MIMO. MU-MIMO is a set of MIMO technologies for multipath wireless communication, in which multiple users or terminals, each radioing over one or more antennas, communicate with one another. In contrast, SU-MIMO involves a single multi-antenna-equipped user or terminal communicating with precisely one other similarly equipped node.

Overview of Demodulation Reference Signals

DMRSs refers to demodulation reference signals. A DMRS is used by a new radio (NR) receiver to produce channel estimates for demodulation of associated physical channel. The design and mapping of the DMRS is specific to each of NR physical channels (e.g., physical downlink control channel (PDCCH), physical downlink shared channel (PDSCH), physical uplink shared channel (PUSCH), and physical uplink control channel (PUCCH)). The DMRS is user equipment (UE) specific which is transmitted on demand. The DMRS supports massive multi-user multiple-input multiple-output (MIMO). The DMRS can be beamformed and supports up to about 12 orthogonal layers. A DMRS sequence for cyclic prefix-orthogonal frequency division multiplexing (CP-OFDM) version is Quadrature Phase Shift Keying (QPSK) based on gold sequences. The QPSK is a form of phase shift keying in which two bits are modulated at once, selecting one of four possible carrier phase shifts (0, 90, 180, or 270 degrees).

As noted above, the DMRS may be used to estimate a radio channel. The signal is present only in resource blocks (RBs) allocated for a PDSCH. The DMRS structure is designed to support different deployment scenarios and use cases. A front-loaded design supports low-latency transmissions, twelve orthogonal antenna ports for MIMO transmissions, and up to four reference signal transmission instances in a slot to support high-speed scenarios. The front-loaded reference signals indicate that the signal occurs early in the transmission. The DMRS is present in each RB allocated for the PDSCH.

The parameters that control DMRS OFDM symbol locations are: PDSCH symbol allocation, mapping type, DMRS type A position, DMRS length, and DMRS additional position.

The symbol allocation of the PDSCH indicates the OFDM symbol locations used by the PDSCH transmission in a slot. DMRS symbol locations lie within the PDSCH symbol allocation. The positions of DMRS OFDM symbols depend on the mapping type. The mapping type of the PDSCH is either slot-wise (type A) or non-slot-wise (type B).

For mapping type A, the DMRS OFDM symbol locations are defined relative to the first OFDM symbol of the slot (symbol #0). The location of first DMRS OFDM symbol ($l_0$) is provided by the DMRS type A position, which is either 2 or 3. For any additional DMRS, the duration of OFDM symbols ($l_d$) is the number of OFDM symbols between the first OFDM symbol of the slot (symbol #0) and the last OFDM symbol of the allocated PDSCH resources. Note that $l_d$ may differ from the number of OFDM symbols allocated for PDSCH, when the first OFDM symbol of PDSCH is other than symbol #0.

For mapping type B, the DMRS OFDM symbol locations are defined relative to the first OFDM symbol of allocated PDSCH resources. The location of first DM-RS OFDM symbol ($l_0$) is always 0, meaning that the first DM-RS OFDM symbol location is the first OFDM symbol location of the allocated PDSCH resources. For any additional DM-RS, the duration of OFDM symbols ($l_d$) is the duration of the allocated PDSCH resources.

The parameters that control subcarrier locations of DMRS are DMRS configuration type and DMRS antenna port. The configuration type indicates a frequency density of DMRS and is signaled by radio resource control (RRC) message dmrs-Type. Configuration type 1 defines six subcarriers per physical resource block (PRB) per antenna port, including alternate subcarriers. Configuration type 2 defines four subcarriers per PRB per antenna port, consisting of two groups of two consecutive subcarriers.

Overview of Transmission Modes

Full-duplex (FD) allows for simultaneous transmission between nodes (e.g., a user equipment (UE) and a base station (BS)). In a half-duplex (HD) system, communication flows in one direction at a time.

There are various motivations for utilizing FD communications, for example, for simultaneous uplink (UL)/downlink (DL) transmissions in Frequency Range 2 (FR2). In some cases, FD capability may enable flexible time division duplexing (TDD) capability, and may be present at either a base station (BS) or a UE or both. For example, at the UE, UL transmissions may be sent from one antenna panel (e.g., of multiple antenna panels) and DL receptions may be performed at another antenna panel. In another example, at a gNodeB (gNB), the UL transmissions may be from one panel and the DL receptions may be performed at another panel.

The FD capability may be conditional on a beam separation (e.g., self-interference between DL and UL, clutter echo, etc.). The FD capability may mean that the UE or the gNB is able to use frequency division multiplexing (FDM) or spatial division multiplexing (SDM) on slots conventionally reserved for UL only or DL only slots (or flexible slots that may be dynamically indicated as either UL or DL).

The potential benefits of the FD communications include latency reduction (e.g., it may be possible to receive DL signals in what would be considered UL only slots, which can enable latency savings), coverage enhancement, spectrum efficiency enhancements (per cell and/or per UE), and/or overall more efficient resource utilization.

Figure 5:
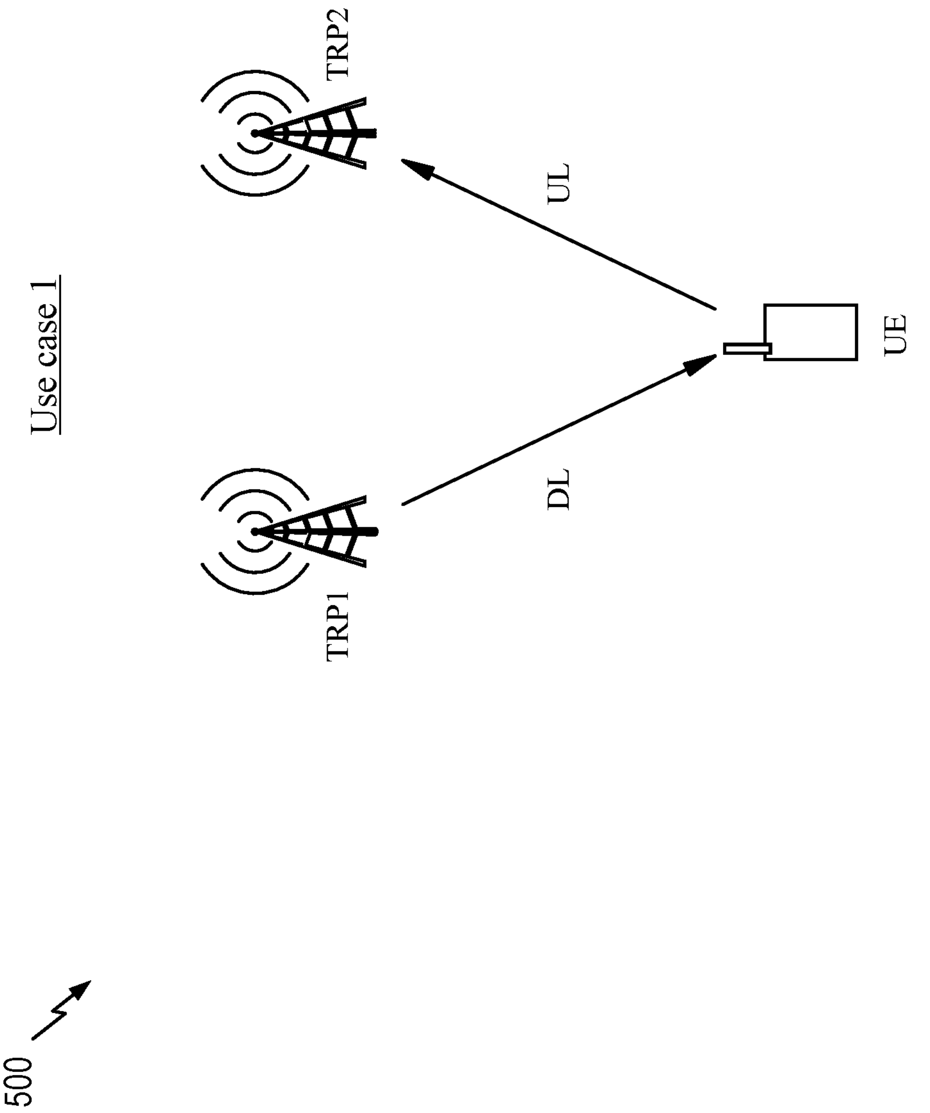
Figure 6:
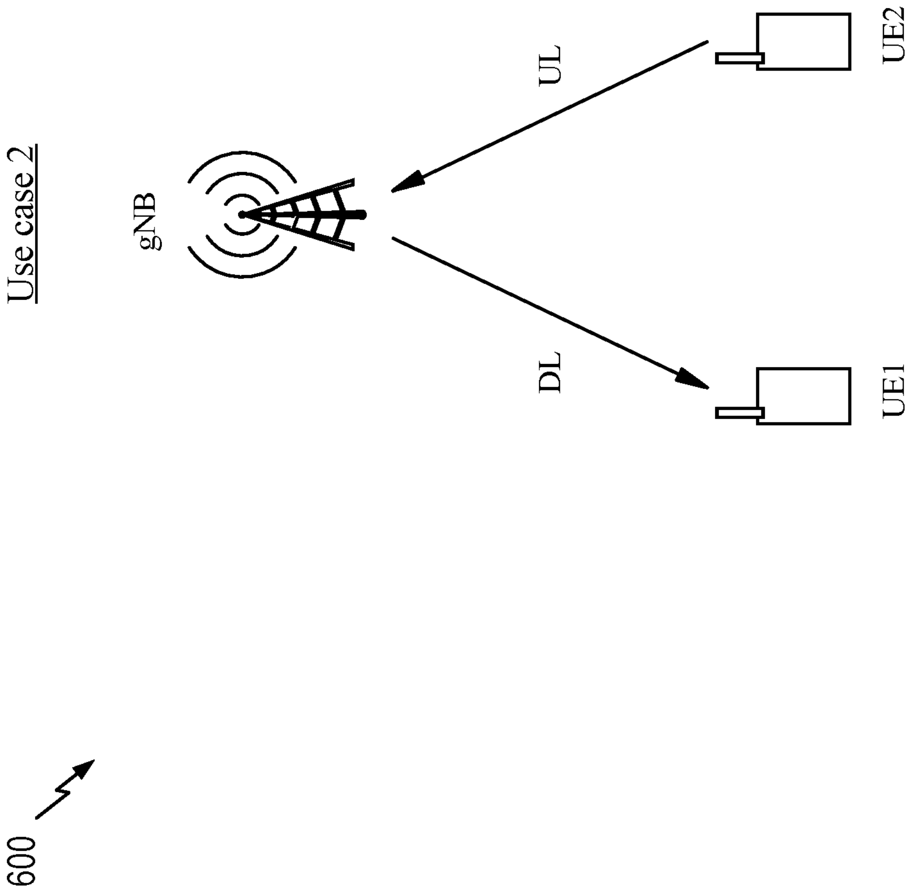
Figure 7:
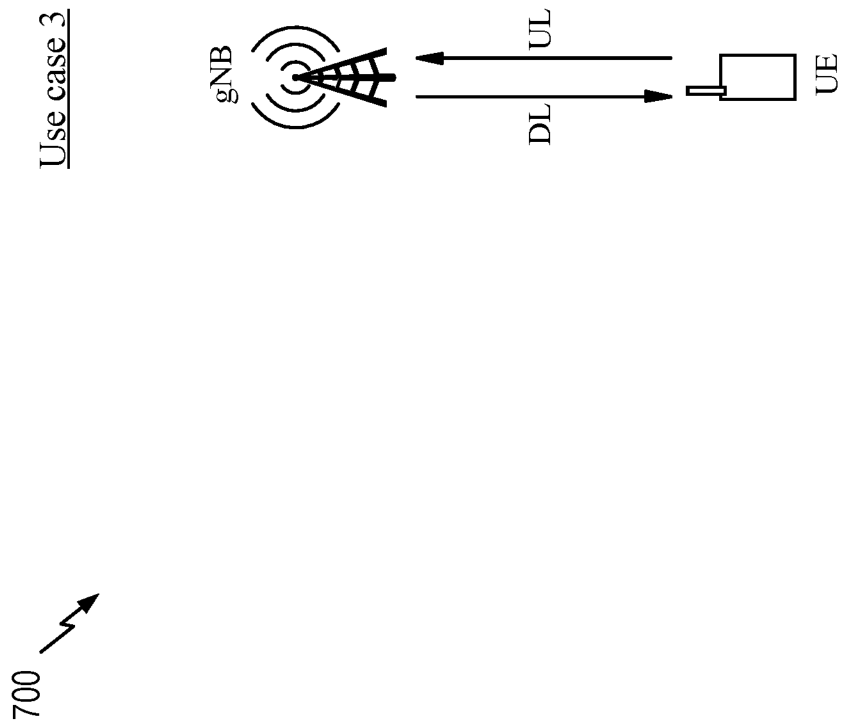

FIG. 5, FIG. 6, and FIG. 7 illustrate example use cases for FD communications. FIG. 8 summarizes certain possible features of these use cases.

Diagram 500 of FIG. 5 illustrates a first use case (e.g., Use Case 1) for FD communications. As illustrated, one UE simultaneously communicates with a first transmitter receiver point (TRP 1) on DL, while transmitting to a second TRP on UL. For this use case, FD is disabled at a gNB (i.e., TRP 1, TRP 2) and enabled at the UE.

Diagram 600 of FIG. 6 illustrates a second use case (e.g., Use Case 2) for FD communications. As illustrated, one gNB simultaneously communicates with a first UE (UE 1) on DL, while communicating with a second UE (UE 2) on UL. For this use case, FD is enabled at the gNB and disabled at the UEs. Use cases with the FD enabled at the gNB and disabled at the UEs may be suitable for integrated access and backhaul (IAB) applications as well (e.g., as illustrated in a table 800 of FIG. 8).

Diagram 700 of FIG. 7 illustrates a third use case (e.g., Use Case 3) for FD communications. As illustrated, a UE simultaneously communicates with a gNB, transmitting on UL while receiving on DL. For this use case, FD is enabled at both the gNB and the UE.

Overview of Sub-band Full Duplex (SBFD)

As compared to older communication standards, spectrum options for 5G new radio (NR) are considerably expanded. For example, a frequency range 2 (FR2) band extends from approximately 24 GHz to 60 GHz. Since the wavelength decreases as the frequency increases, the FR2 band is denoted as a millimeter wave band due to its relatively-small wavelengths. In light of this relatively short wavelength, the transmitted radio frequency (RF) signals in the FR2 band behave somewhat like visible light. Thus, just like light, millimeter-wave signals are readily shadowed by buildings and other obstacles. In addition, the received power per unit area of antenna element goes down as the frequency goes up. For example, a patch antenna element is typically a fraction of the operating wavelength (e.g., one-half of the wavelength) in width and length. As the wavelength goes down (and thus the size of the antenna element decreases), it may thus be seen that the signal energy received at the corresponding antenna element decreases. Millimeter-wave cellular networks will generally require a relatively-large number of base stations (BSs) due to the issues of shadowing and decreased received signal strength. A cellular provider must typically rent the real estate for the BSs such that widespread coverage for a millimeter-wave cellular network may become very costly.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHZ. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, just as was established for older networks, a 5G NR cellular network operating in the FR1 band will not require an inordinate amount of BSs. Given the favorable properties of the lower frequency bands, the sub-6 GHz bands are often denoted as "beachfront" bands due to their desirability.

One issue with operation in the sub-6 GHz bands is that there is only so much bandwidth available. For this reason, Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a "sub-band full duplex" (SBFD) network architecture is implemented, which is quite advantageous as it offers users the high data rates that would otherwise require usage of the FR2 band. The SBFD network architecture described herein provides the high data rates in the FR1 band, and thus lowers costs due to the smaller number of BSs per given area of coverage that may be achieved in the FR1 band as compared to the FR2 band.

Typically, each one millisecond (ms) sub frame may consist of one or multiple adjacent slots. For example, one sub frame includes four slots. In a four-slot structure, first two slots may be downlink (DL) slots whereas a final one of the fours slots is an uplink (UL) slot. The third slot is a special slot in which some symbols may be used for UL transmissions and others for DL transmissions. The resulting UL and DL traffic is thus time division duplexed (TDD) as arranged by the dedicated slots and as arranged by the symbol assignment in the special slot. Since the UL has only a single dedicated slot, UL communication may suffer from excessive latency since a user equipment (UE) is restricted to transmitting in the single dedicated UL slot and in the resource allocations within the special slot. Since there is only one dedicated UL slot in the repeating four-slot structure, the resulting latency can be problematic particularly for low-latency applications such as vehicle-to-vehicle communication. In addition, the energy for the UL communication is limited by its single dedicated slot.

To reduce uplink latency and increase the energy for the UL transmissions, SBFD mode may be implemented. The SBFD mode is a duplex mode with a TDD carrier split into sub-bands to enable simultaneous transmission and reception in same slots. For example, in the SBFD mode, some slots are modified as SBFD slots to support frequency duplexing for simultaneous UL and DL transmissions. Some slots may remain as legacy TDD slots where one slot is still dedicated to DL and another slot dedicated to UL. In one example four-slot structure, in the SBFD mode, the second and third slots may be SBFD slots modified to support frequency duplexing for simultaneous UL and DL transmissions. The first slot and the fourth slot may remain as legacy TDD slots such that the first slot is still dedicated to DL and the fourth slot dedicated to UL. In other examples, any slot may be used in the SBFD mode.

In the sub-6 GHz spectrum, the relatively-limited separation between antennas on a device will lead to substantial self-interference should the device engage in a simultaneous UL and DL transmission. In some cases, the frequency duplexing in the SBFD slots may be practiced by a BS transceiver.

Figure 9:
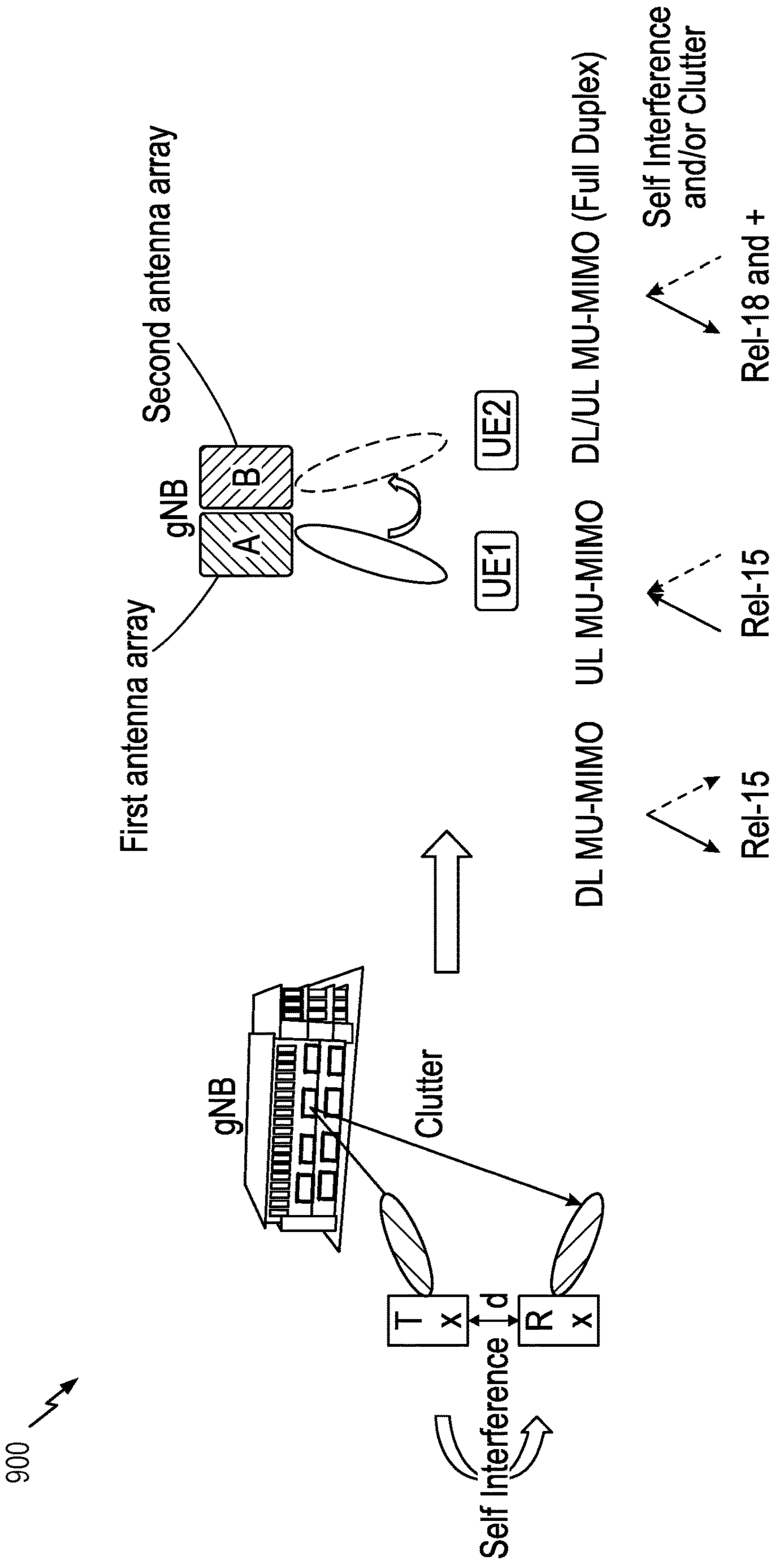
FIG. 9 depicts example FD operation at a gNodeB (gNB).

For example, diagram 900 of FIG. 9 depicts full-duplex (FD) operation at a gNodeB (gNB). An antenna system for the gNB is subdivided into a first antenna array that is separated from a second antenna array by an insulating distance such as, for example, 10 to 30 cm. During the SBFD operation, one of the antenna arrays transmits (e.g., to a first UE (UE1)) while the other antenna array is receiving (e.g., from a second UE (UE2)). The self-interference problem is partially addressed by a physical separation between the antenna arrays of the gNB. To provide additional isolation, a conducting shield between the antenna arrays of the gNB may also be implemented. It will be appreciated, however, that frequency duplexing may also be practiced by the device (or more generally, a UE) should the device practice sufficient self-interference cancellation. In other cases, however, the UE may be limited to half-duplex (HD) transmission such that the UE's antenna array is entirely dedicated to just transmitting or to just receiving in respective slots.

Figure 10:
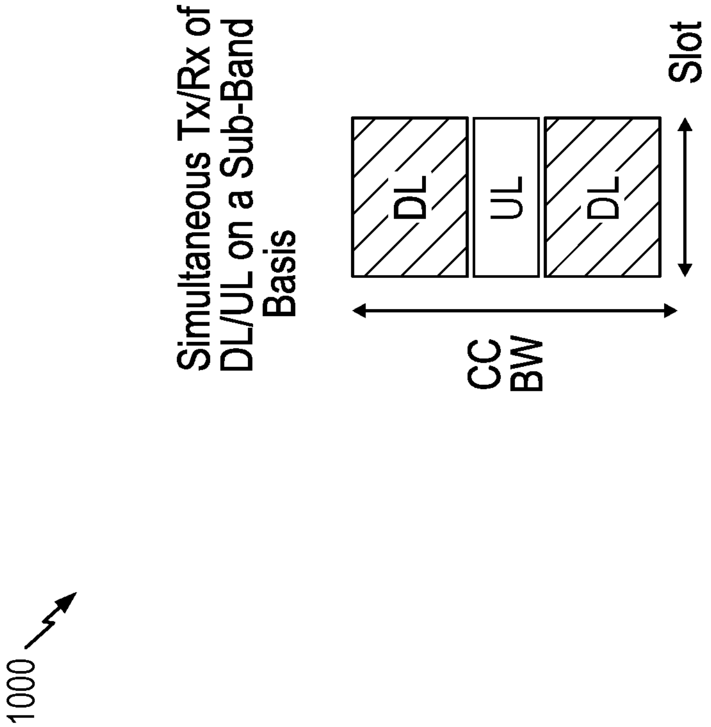
FIG. 10 and FIG. 11 depict example sub-band full duplex (SBFD) slots.
Figure 11:
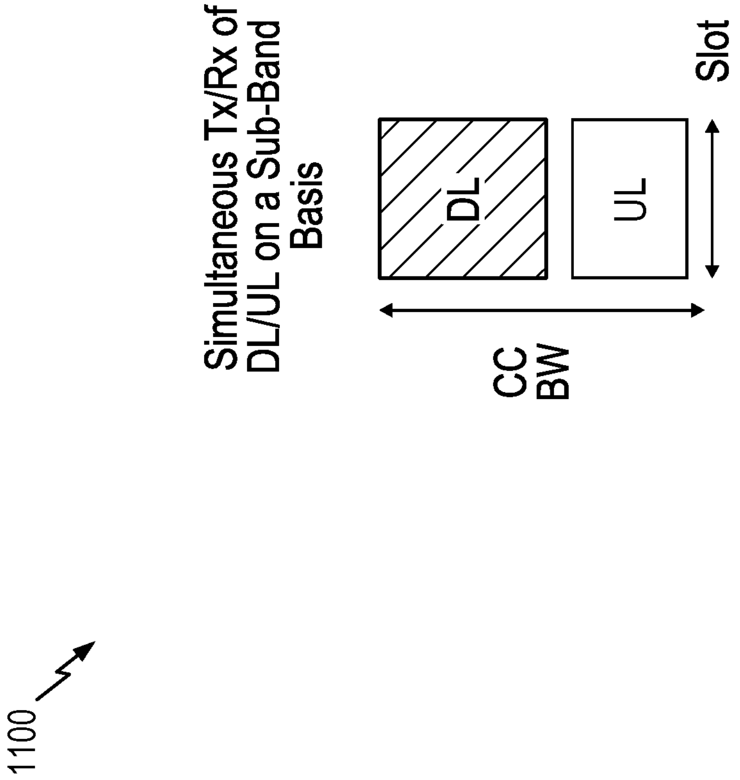

Example SBFD slots are depicted in FIG. 10 and FIG. 11. For example, FIG. 10 depicts SBFD slot 1000 and FIG. 11 depicts SBFD slot 1100. Note that neither the UL nor the DL in the SBFD slots 1000, 1100 may occupy an entire frequency resource range (e.g., a frequency band) for these SBFD slots.

As depicted in FIG. 10, the UL occupies a central sub-band in the frequency band for the SBFD slot 1000. The DL occupies a lower sub-band that ranges from a lower frequency for the frequency band up to a lowest frequency for the UL central sub-band. In some cases, the sub-bands may be separated by a guard band. The DL also occupies an upper sub-band in the frequency band and extends from a greatest frequency for the UL central sub-band to a greatest frequency for the frequency band. In one example, the UL central sub-band may be symmetric about a center frequency for the SBFD slot 1000. In such example, the bandwidth for the DL lower sub-band and the DL upper sub-band would be equal. However, in other examples, the DL lower sub-band bandwidth may be different from the bandwidth for the DL upper sub-band. In some examples, the DL upper and lower sub-bands may each have the bandwidth that may vary as 10 MHz, 20 MHZ, 30 MHz or 40 MHz depending upon a DL data rate.

The use of the SBFD slot is advantageous with regard to minimizing or reducing UE-to-UE interference and transmit-to-receive self-interference at a BS. In some cases, the use of the SBFD slot may also enhance system capacity, improve resource utilization and spectrum efficiency (e.g., by enabling flexible and dynamic UL/DL resource adaption according to UL/DL traffic in a robust manner).

Overview of Orphan Resource Element (RE)

A radio frame may be divided into sub frames. Each sub frame may be divided into slots. Each slot may include orthogonal frequency division multiplexed (OFDM) symbols. In some cases, some subcarriers may be grouped together for duration of one slot, which may be termed as a physical resource block (PRB).

In some cases, the PRB may include 12 subcarriers, from each of seven OFDM symbols. A single subcarrier component of an OFDM symbol may be referred to as a resource element (RE). A RE may be a smallest unit of resource assignment. Different REs may be dedicated to carry different types of information. For example, a first set of REs may be used to carry either physical downlink control channel (PDCCH) data or physical control format indicator channel (PCFICH) data, while a second set of REs may be used to carry demodulation reference signals (DMRS). A third set of REs may be available to carry data (e.g., depending on configuration). The actual assignment of data type to RE may be dependent upon a communications mode being used, a number of antenna ports, and so on.

In some cases, an even number of REs in a frequency domain may be required for a transmission (e.g., a space frequency block coding (SFBC) transmission). The SFBC may be a coding technique for transmit diversity. In SFBC, blocks of data transmitted using a plurality of transmit antennas are separated in space (e.g., arising from the separation between transmit antennas of the plurality of transmit antennas) and frequency (e.g., due to the separation in frequency between subcarriers used to convey the blocks of data). SFBC operation is performed on sets of complex valued modulation symbols, and the sets of complex valued modulation symbols are mapped onto resources of the transmit antennas in various combinations of modulation symbol ordering, modulation symbol sign, and complex conjugation.

As an example, the SFBC transmission with two transmit antenna ports may require two REs in the frequency domain, while four transmit antenna ports may require four REs in the frequency domain. The even number of REs may be grouped together into groups of two, which may be referred to as paired REs.

However, in some OFDM symbols, some REs may already be dedicated for other data types (e.g., for DMRS data), and are not available for data transmission. If there is an odd number of REs in the OFDM symbol remaining for data transmission, then at least one of the REs may not be usable for the SFBC transmission. The REs unusable for the SFBC transmission may be referred to as orphan REs.

Overview of Orphan Resource Element (RE) Issue

In some cases, a user equipment (UE) may report capability information of the UE to a gNodeB (gNB). The capability information may indicate whether the UE can be scheduled (e.g., for resources) via a physical downlink shared channel (PDSCH), without one or more scheduling restrictions or rules being applied at the gNB (e.g., for full duplex (FD) orthogonal covering coding (OCC) length 4 in Release-18 eType 1 demodulation reference signals (DMRS)).

In some cases, when such UE capability may not supported by the UE, the UE may expect that the gNB may apply the one or more scheduling restrictions for scheduling the resources via the PDSCH (e.g., for FD-OCC length 4 in Release-18 eType 1 DMRS). The application of the one or more scheduling restrictions may correspond to satisfying multiple rules (e.g., at least for other than multi transmission and reception point (M-TRP) PDSCH transmission with frequency division multiplexing (FDM) 2a or FDM 2b scheme). One of the multiple rules may indicate that a number of consecutively scheduled physical resource blocks (PRBs) for a PDSCH is even. Another rule may indicate that a number of PRBs offset of a scheduled PDSCH from a reference point (e.g., a common resource block 0) is even.

In some cases, it may be up to the UE on how to implement DMRS channel estimation. In some cases, there may be no radio access network (RAN) specification enhancement to handle orphan resource elements (REs). For example, when a total number of REs of DMRS in a code division multiplexing (CDM) group may not be in multiples of four, there may be no defined way on how to handle remainder of REs for the UE that may be scheduled for the UE using a PDSCH without the one or more scheduling restrictions.

In some cases (e.g., for FD-OCC length 4 in Release-18 eType 1 DMRS for physical uplink shared channel (PUSCH)), there may be no need for the RAN specification enhancement to handle an orphan RE issue (i.e., when the total number of REs of the DMRS in the CDM group is not in the multiples of four, how to handle the remainder of REs), because the gNB (e.g., which may be a receiver device) may decide whether the one or more scheduling restrictions are needed or not (i.e., to be applied or not for scheduling the resources for the UE).

In some cases, when the UE may not support an orphan RE capability (i.e., the UE may receive the PDSCH without the one or more scheduling restrictions (e.g., for FD-OCC length 4 in Release-18 eType 1 DMRS)), the one or more scheduling restrictions may be applied by the gNB for the PDSCH. One scheduling restriction may indicate that a number of consecutively seheduled PRBs for a PDSCH for each transmission configuration indication (TCI) state is even. In some cases, when a precoding granularity may be set to a wideband, a total number of PRBs allocated to the UE may be in multiples of four to ensure a number of consecutively scheduled PRBs for the PDSCH for each TCI state is even. Another scheduling restriction may indicate that a number of PRBs offset of a scheduled PDSCH for each TCI state from a reference point (e.g., a common resource block 0) is even.

In some cases, the UE may be configured for a half-duplex (HD) operation. The UE may also be configured with a time resource and/or a frequency location associated with a sub-band full duplex (SBFD) duplexing scheme at the gNB (i.e., the SBFD-aware UE). The SBFD-aware UE may bring scenarios, which may result into orphan resource blocks (RBs) for eType1 DMRS.

Figure 12:
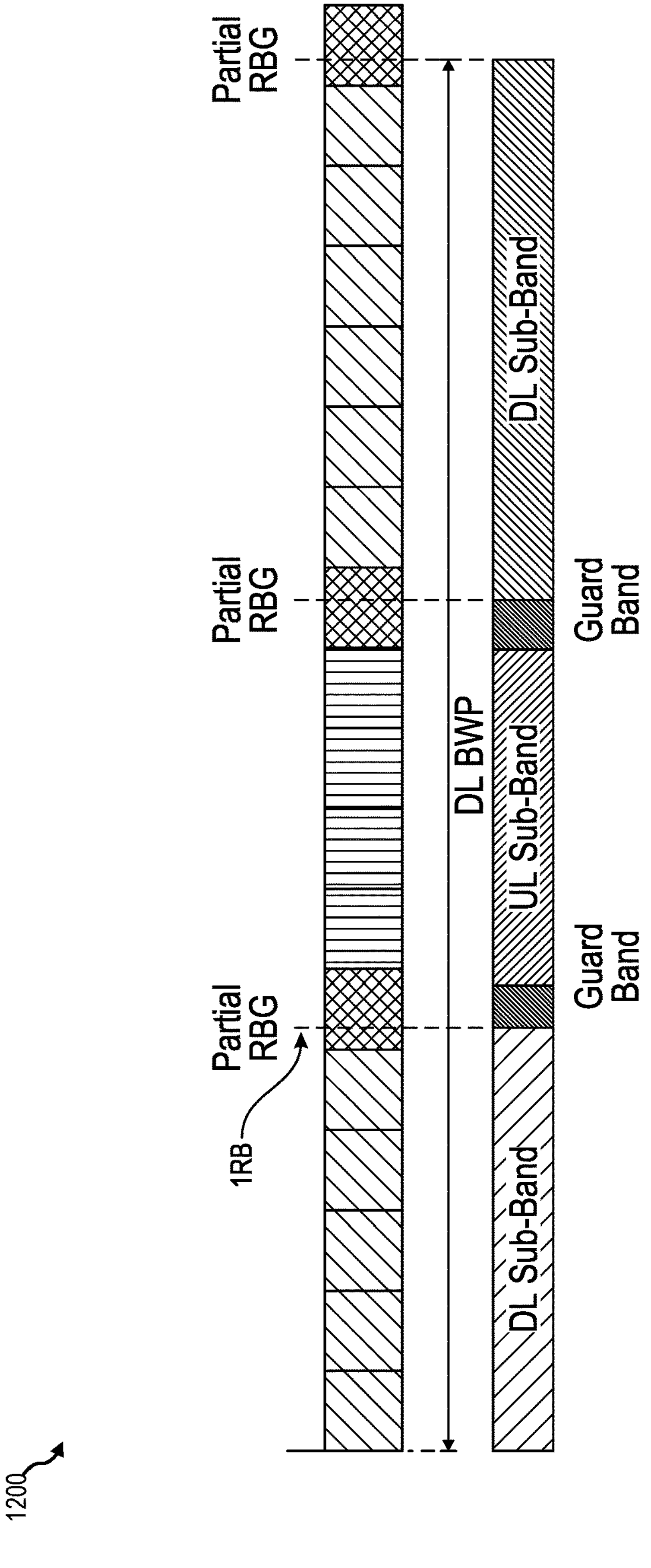
FIG. 12 depicts example partial resource block groups (RBGs).

In one scenario, when a PDSCH physical resource block group (PRG) may be a narrowband (e.g., PRG size=2 or 4); for resource allocation (RA) Type 0 (Bitmap), the introduction of partial resource block groups (RBGs) within the UE downlink bandwidth part (BWP) may lead to the partial PRGs. For example, for PDSCH frequency domain resource allocation (FDRA) Type 0 (Bitmap), due to a partial overlap of downlink sub-band RBGs grid, there may be a partial RBG at sides of the downlink sub-bands (e.g., as illustrated in a diagram 1200 of FIG. 12). Note that there is no limit on a minimum size of a partial RBG in current specification (e.g., at least as one RB). In some cases, a size of the RBG may depend on a BWP size. This issue (e.g., of the partial PRGs) may be applicable at least for the narrowband (e.g., PRG size={2,4}).

For RA Type 1 (resource indicator value (RIV)), multiple segments of allocated PRBs may have an odd number of PRBs. For example, for PDSCH FDRA Type 1 (RIV-based), with enhanced RM pattern which may include resources outside downlink sub-band(s), there may be two segments of allocated PRB that may include the odd number of PRBs per segment. This issue (e.g., of the partial PRGs) may be applicable at least for narrowband PRG size={2,4}. The issue may become more pronounced with virtual resource block (VRB)-to-PRB interleaving.

In another scenario, when PDSCH PRG is a determined wideband (i.e., PRG=wideband), the enhancement of DL-RM, i.e., the relax restriction of DMRS symbols overlap with RM, which may result into an odd number of RBs per each downlink sub-band and the introduction of orphan RBs at/across a boundary of the RM pattern (e.g., uplink sub-band+guard band). For example, the SBFD-aware UE may support a wideband PDSCH across two downlink sub-bands. The PDSCH may have non-consecutive PRBs, but consecutive within each downlink sub-band. In such cases, even with the UE satisfying requirements (e.g., an offset of scheduled PDSCH is even and even number of RBs), a number of consecutive PRBs within each downlink sub-band may be odd.

Aspects Related to Orphan RE for eType 1 DMRS in SBFD

Aspects of the present disclosure provide apparatuses, methods, processing systems, and computer-readable mediums for managing scheduling of resources for a sub-band full duplex (SBFD)-aware user equipment (UE).

Techniques described herein may enable a gNodeB (gNB) to implement one or more scheduling restrictions for scheduling resources for the SBFD-aware UE, which may not support the use of orphan resource elements (REs). For example, for the SBFD-aware UE scheduled with one or more partial physical resource block groups (PRGs) per downlink sub-band within a UE downlink bandwidth part (BWP), if the UE does not support an orphan RE capability, the gNB may have applied the scheduling restrictions to ensure that a number of each consecutive set of physical resource blocks (PRBs) per each downlink sub-band is even.

Particular aspects of the subject matter described in this disclosure can be implemented to realize one or more of the following potential advantages. In some examples, the described techniques may lead to the efficient use of the resources for the transmissions as no resource is wasted or is unused.

The techniques proposed herein for managing the scheduling of the resources for the SBFD-aware UE may be understood with reference to FIG. 13-FIG. 19.

Figure 13:
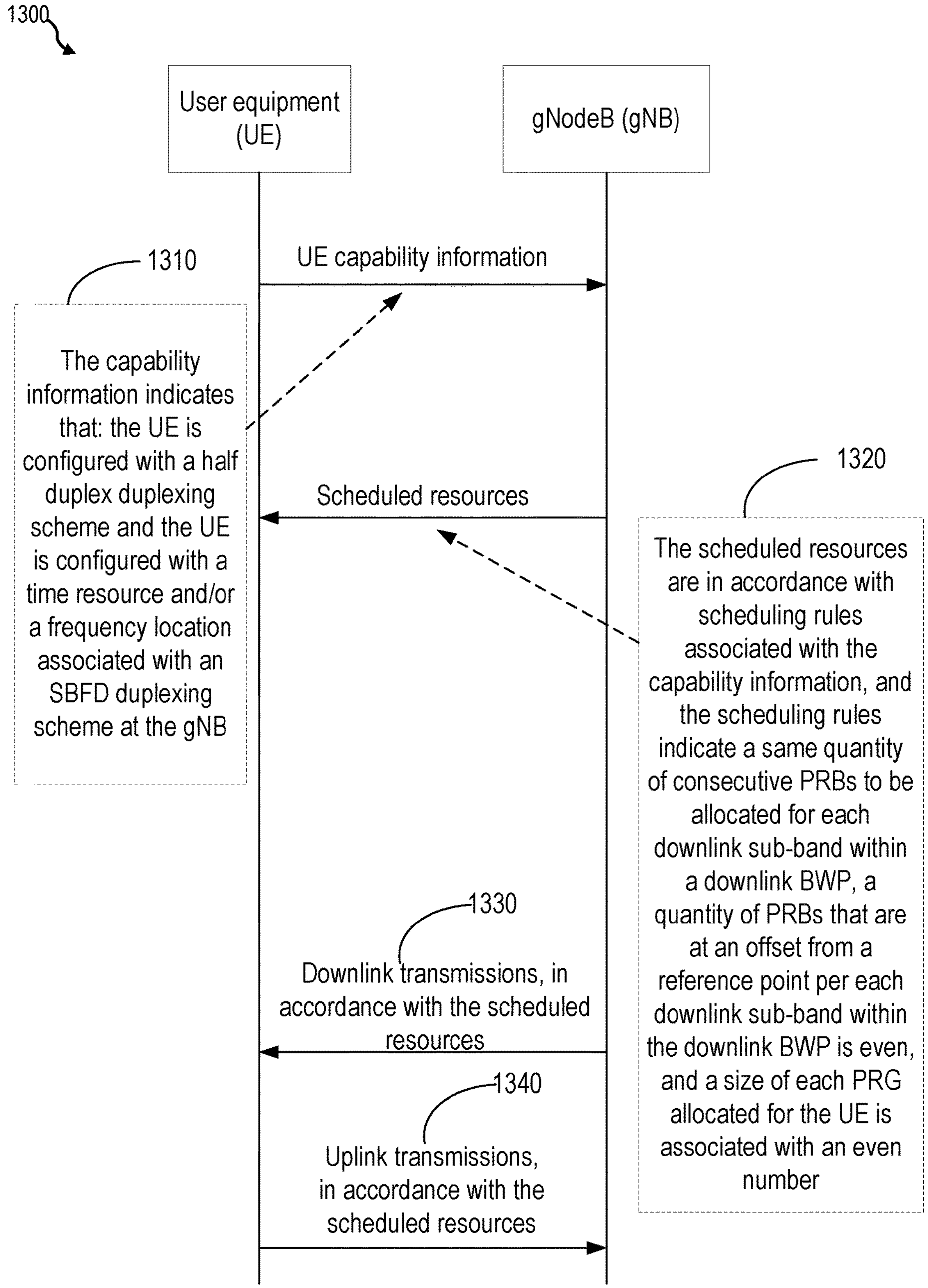
FIG. 13 depicts a call flow diagram illustrating example communication among wireless nodes (such as a UE and a network entity) for managing scheduling of resources for a SBFD-aware wireless node.
Figure 14:
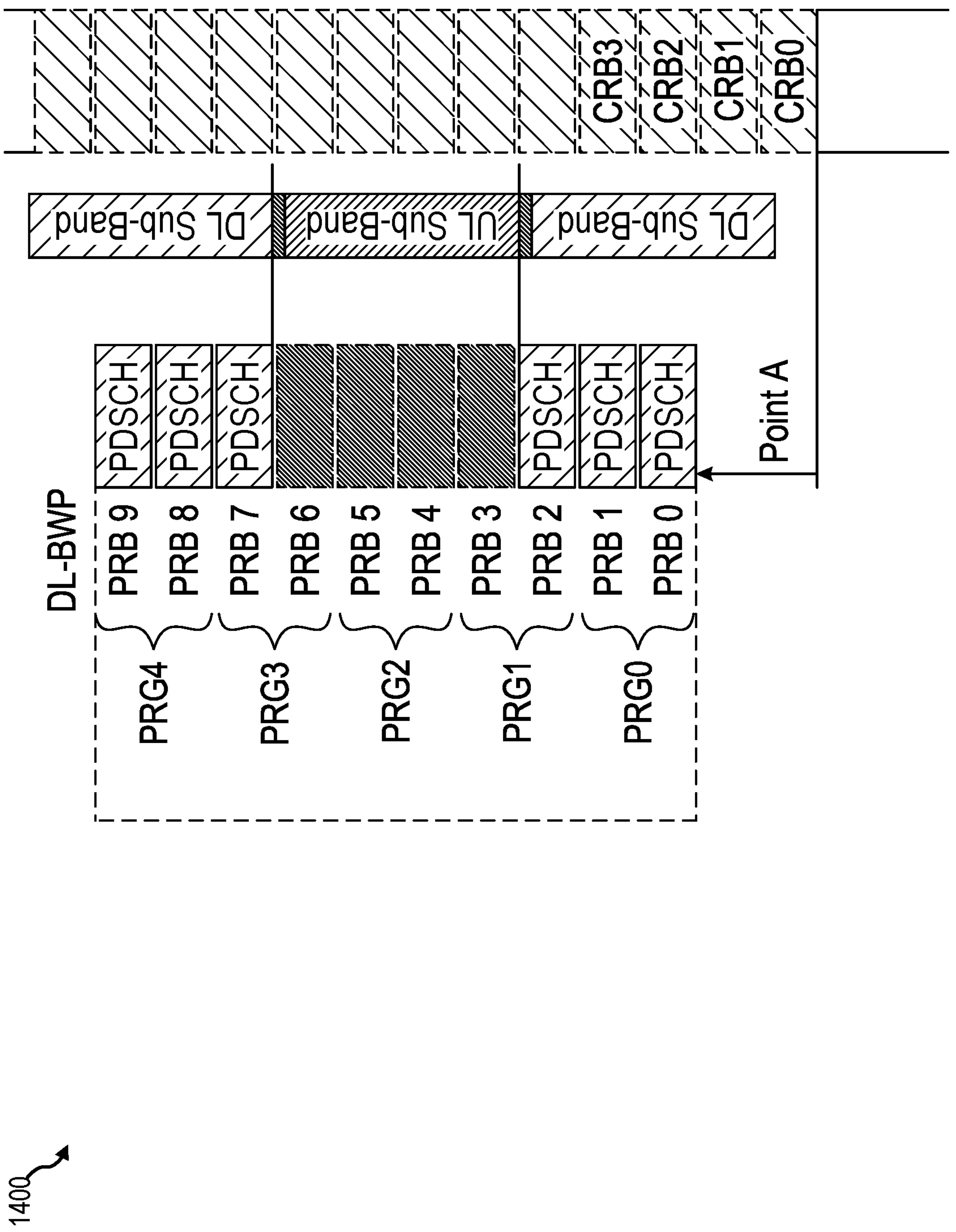
FIG. 14 depicts example physical resource block groups (PRGs) for downlink sub-bands.
Figure 15:
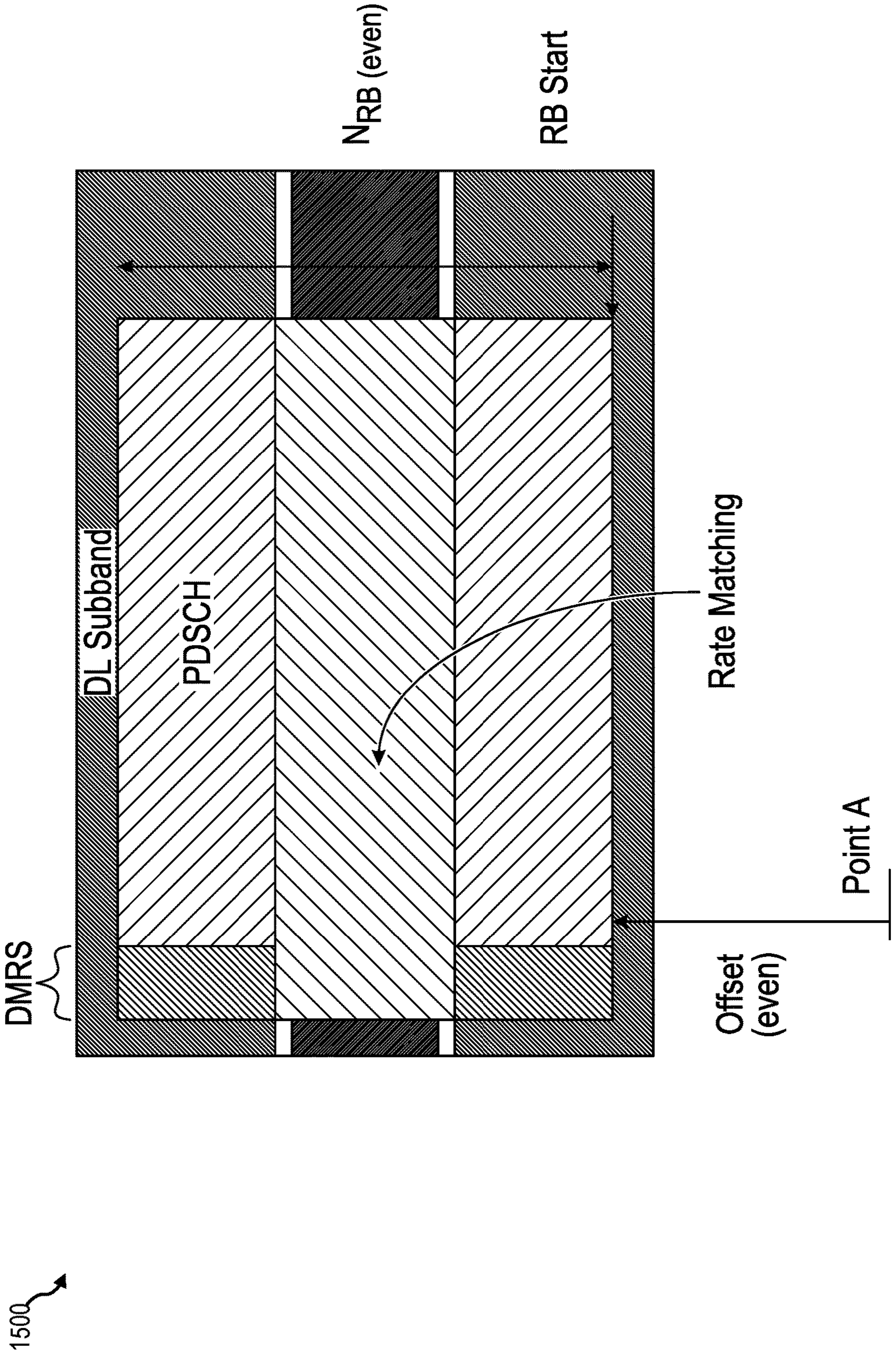
FIG. 15 depicts example downlink sub-band.

FIG. 13 depicts a call flow diagram 1300 illustrating example communication among wireless nodes such as a UE and a network entity (e.g., a gNB) for managing the scheduling of the resources for the SBFD-aware UE (e.g., which may also be a half-duplex (HD) UE). The UE shown in FIG. 13 may be an example of the UE 104 depicted and described with respect to FIG. 1 and FIG. 3. The gNB depicted in FIG. 13 may be an example of the BS 102 depicted and described with respect to FIG. 1 and FIG. 3, or the disaggregated BS depicted and described with respect to FIG. 2.

As indicated at 1310, the UE sends capability information of the UE to the gNB.

In certain aspects, the capability information may indicate that the UE is configured with a half duplex duplexing scheme.

In certain aspects, the capability information may indicate that the UE is configured with a time resource associated with an SBFD duplexing scheme at the gNB.

In certain aspects, the capability information may indicate that the UE is configured with a frequency location associated with the SBFD duplexing scheme at the gNB.

In certain aspects, the capability information may indicate that the UE is configured with both the time resource and the frequency location associated with the SBFD duplexing scheme at the gNB.

In certain aspects, the capability information may indicate that the UE supports scheduling of one or more partial physical resource block groups (PRGs) per downlink sub-band within a downlink bandwidth part (BWP) for the UE.

In one example, the capability information may indicate that the UE can be scheduled with a physical downlink shared channel (PDSCH) resource allocation (RA) Type 0 with the one or more partial PRGs per downlink sub-band within UE downlink BWP. In the RA Type 0, multiple consecutive resource blocks (RBs) may be bundled into a resource block group (RBG) and the PDSCH may be allocated only in the multiples of the RBG. A number of RBs within the RBG may vary depending on BWP size. In some cases, the RA for Type 0 may be configured in a form of a bitmap.

In another example, the capability information may indicate that the UE can be scheduled with the PDSCH RA Type 1 with the one or more partial PRGs per downlink sub-band within UE downlink BWP. In the RA Type 1, a resource may be allocated to one or more consecutive RBs. The resource allocation area may be defined by parameters such as RB_Start and a number of consecutive RBs within a specific BWP. When the resource allocation is specified (e.g., in downlink control information (DCI)), the RB_Start and the number of consecutive RBs within the BWP may be combined into a specific single value called resource indicator value (RIV). That is, the RA for Type 1 may be configured in a form of the RIV.

In certain aspects, one or more physical resource blocks (PRBs) of a total number of PRBs in each partial PRG may be used for one or more transmissions. For example, a nominal size of PRG may be determined or configured to be two or four. In some cases, some of the PRG(s) may not fully overlap with the UE downlink BWP. In some cases, some of the PRG(s) may not fully overlap with a downlink sub-band or an uplink sub-band. In such cases, only a subset of the PRBs within a PRG may be used. Such PRG may be called as a partial PRG.

In certain aspects, the capability information may indicate that the UE may not support orphan resource element (RE) capability. For example, the UE may not support scheduling of REs that are not in multiples of an even number. In another example, a total number of REs of demodulation reference signals (DMRS) in a code division multiplexing (CDM) group may not be in multiples of a code length (i.e., two REs in a CDM group of length (e.g., four)).

In certain aspects, the capability information may indicate the UE may support PDSCH scheduling of non-contiguous PRBs across two downlink sub-bands (e.g., within the downlink BWP for the UE) with contiguous PRBs in each downlink sub-band (e.g., within the downlink BWP for the UE). In certain aspects, the capability information may indicate the UE may support scheduling of one or more PRGs with a wideband precoding across two downlink sub-bands.

For example, the capability information may indicate the UE (e.g., an SBFD-aware UE) may support wideband precoded PDSCH scheduling across the two downlink sub-bands (e.g., consecutive PRBs per downlink sub-band), and may not support the orphan RE capability. In some cases, a number of scheduled PRBs in each downlink sub-band may be even.

In certain aspects, the capability information may indicate that the UE may support scheduling of resources with a wideband precoding.

As indicated at 1320, the gNB transmits an indication of scheduled resources for one or more transmissions to the UE. The scheduled resources may be in accordance with one or more scheduling rules (and/or scheduling restrictions) associated with the capability information of the UE.

In certain aspects, the gNB may determine the one or more scheduling rules based on the capability information of the UE. In one example, the gNB may determine the one or more scheduling rules based on processing of all of the capability information of the UE. In another example, the gNB may determine the one or more scheduling rules based on processing of some of the capability information of the UE.

In certain aspects, one of the one or more scheduling rules may indicate that a same quantity of consecutive PRBs to be allocated for each downlink sub-band within a downlink BWP.

In certain aspects, one of the one or more scheduling rules may indicate that a number of each consecutive set of PRBs per each downlink subband is even. For example, as illustrated in a diagram 1400 of FIG. 14, each of two downlink sub-bands are associated with a same number of PRBs (e.g., three PRBs).

Referring back to FIG. 13, one of the one or more scheduling rules may indicate that a number of consecutively scheduled PRBs for a PDSCH is even.

In certain aspects, one of the one or more scheduling rules may indicate that a quantity of PRBs that are at an offset from a reference point per each downlink sub-band within the downlink BWP is even. In one example, as illustrated in a diagram 1500 of FIG. 15, a number of PRBs offset of a scheduled PDSCH from a point A (e.g., a common resource block 0) is even.

Referring back to FIG. 13, one of the one or more scheduling rules may indicate that a size of each PRG allocated for the UE may be associated with an even number. In one example, one of the one or more scheduling rules may indicate that when a PRG size is determined to be two, the UE may not expect a partial PRG size to be one. In another example, when a PRG size is determined to be four, the UE may not expect a partial PRG size to be one or a partial PRG size to be three. In some cases, the UE may expect a partial PRG size to be two.

In certain aspects, the gNB may apply or implement the one or more scheduling rules to determine and/or schedule the resources for the UE. In one example, the gNB may apply all of the one or more scheduling rules to determine and/or schedule the resources for the UE. In another example, the gNB may apply some of the one or more scheduling rules to determine and/or schedule the resources for the UE.

In certain aspects, the one or more scheduling rules (e.g., even offset, even PBBs) may work for some UEs as all PRBs with a wideband PDSCH may be consecutive. However, for other UEs (e.g., SBFD-aware UE with two segments of consecutive PRBs), some of the one or more scheduling rules may need to be updated or modified.

In certain aspects, when a UE (e.g., the SBFD-aware UE) determined PRG may be wideband across two downlink sub-bands, the UE may be scheduled with a wideband precoding, and the UE may not support the orphan RE capability, then some of the one or more scheduling rules may be relaxed or replaced by the gNB.

In certain aspects, one of the one or more scheduling rules may indicate that a value of a PRB scheduling offset corresponding to the PRBs allocated in the each downlink sub-band within the downlink BWP for the UE does not have to be even. For example, only a total number of consecutive PRBs per downlink sub-band is even (e.g., and there is no restriction on a PRB offset of a scheduled PDSCH).

In certain aspects, a scheduling rule or restriction may correspond to whether the PRB offset is even or not. Overall, the PRB offset for PRBs in each downlink sub-band may be different.

In certain aspects, one of the one or more scheduling rules may indicate that a value of a PRB scheduling offset corresponding to the PRBs allocated in the each downlink sub-band within the downlink BWP for the UE has to be even. For example, a total number of consecutive PRBs per downlink sub-band is even, and an offset of first scheduled PRBs in each DL sub-band may be even.

As indicated at 1330, the gNB transmits one or more downlink transmissions to the UE, in accordance with the scheduled resources.

As indicated at 1340, the UE transmits one or more uplink transmissions to the gNB, in accordance with the scheduled resources.

Example First Method for Wireless Communications

FIG. 16 shows an example of a method 1600 for wireless communications at a first wireless node. The first wireless node is a user equipment (UE), such as the UE 104 of FIG. 1 and FIG. 3. In some cases, the first wireless node may be a network entity, such as the BS 102 of FIG. 1 and FIG. 3.

Method 1600 begins at step 1610 with outputting capability information of the UE. In some cases, the operations of this step refer to, or may be performed by, circuitry for outputting and/or code for outputting as described with reference to FIG. 18.

Method 1600 then proceeds to step 1620 with obtaining an indication of scheduled resources for one or more transmissions. The scheduled resources are in accordance with one or more scheduling rules associated with the capability information, and the one or more scheduling rules indicate at least one of: a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, or a size of each physical resource block group (PRG) allocated for the UE is associated with an even number. In some cases, the operations of this step refer to, or may be performed by, circuitry for obtaining and/or code for obtaining as described with reference to FIG. 18.

In certain aspects, the capability information indicates at least one of: the UE is configured with a half duplex duplexing scheme; the UE is configured with a time resource associated with a sub-band full duplex (SBFD) duplexing scheme at a network entity; or the UE is configured with a frequency location associated with the SBFD duplexing scheme at the network entity.

In certain aspects, the capability information indicates that the UE supports scheduling of one or more partial PRGs per downlink sub-band within the downlink BWP for the UE, and one or more PRBs of a total number of PRBs in each partial PRG are used for the one or more transmissions.

In certain aspects, the capability information indicates at least one of: the UE supports scheduling of non-contiguous PRBs across two downlink sub-bands within the downlink BWP for the UE with contiguous PRBs in each downlink sub-band within the downlink BWP for the UE and one or more PRGs with a wideband precoding; or the UE does not support scheduling of resource elements (REs) that are not in multiples of an even number.

In certain aspects, the capability information indicates that the UE supports scheduling of resources with a wideband precoding.

In certain aspects, at least one scheduling rule indicates that a value of a PRB scheduling offset corresponding to the PRBs allocated in the each downlink sub-band within the downlink BWP for the UE does not have to be even.

In certain aspects, at least one scheduling rule indicates that a value of a PRB scheduling offset corresponding to the PRBs allocated in the each downlink sub-band within the downlink BWP for the UE has to be even.

Figure 18:
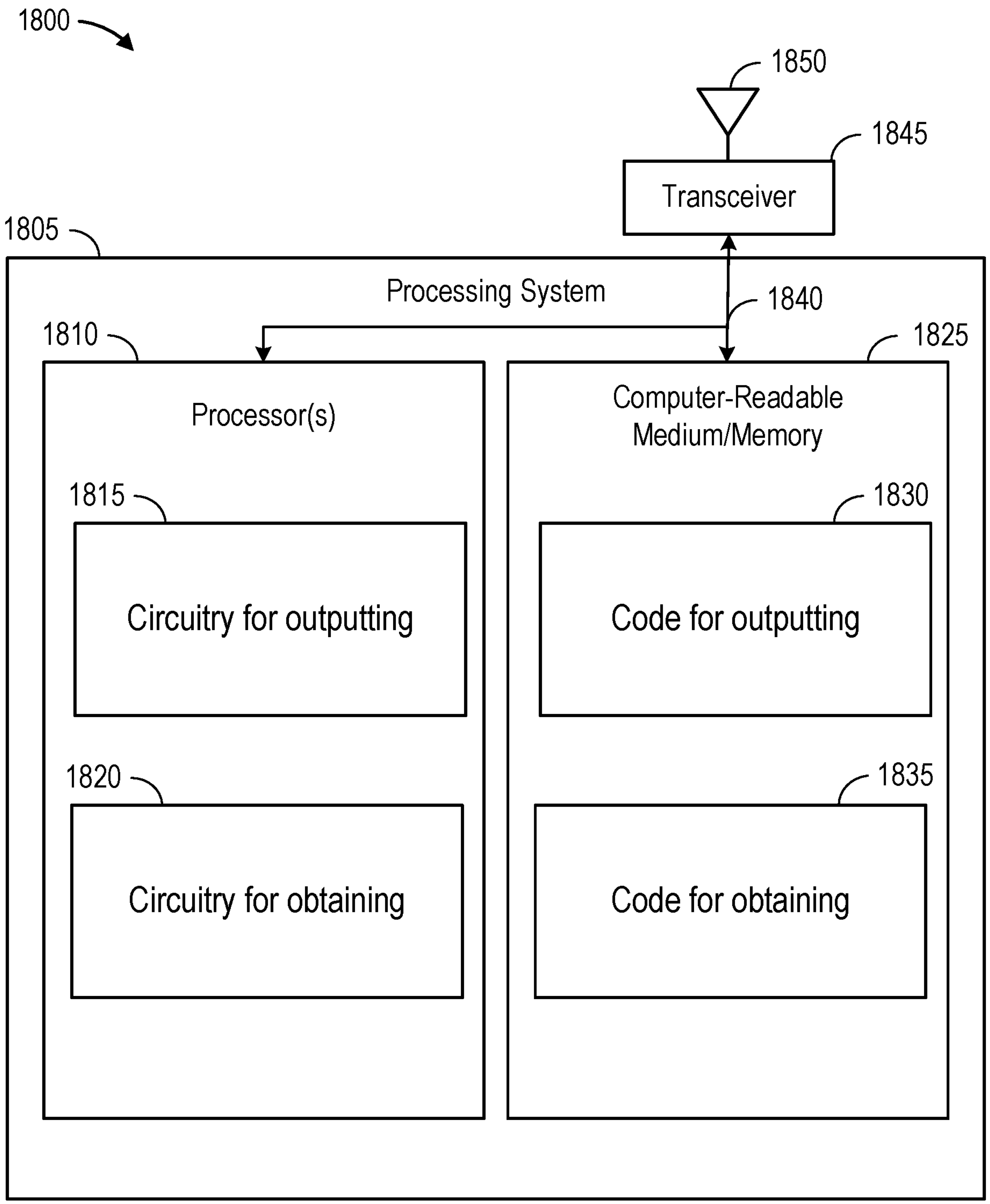
FIG. 18 and FIG. 19 depict example communications devices.

In one aspect, the method 1600, or any aspect related to it, may be performed by an apparatus, such as a communications device 1800 of FIG. 18, which includes various components operable, configured, or adapted to perform the method 1600. The communications device 1800 is described below in further detail.

Note that FIG. 16 is just one example of a method, and other methods including fewer, additional, or alternative steps are possible consistent with this disclosure.

Example Second Method for Wireless Communications

Figure 17:
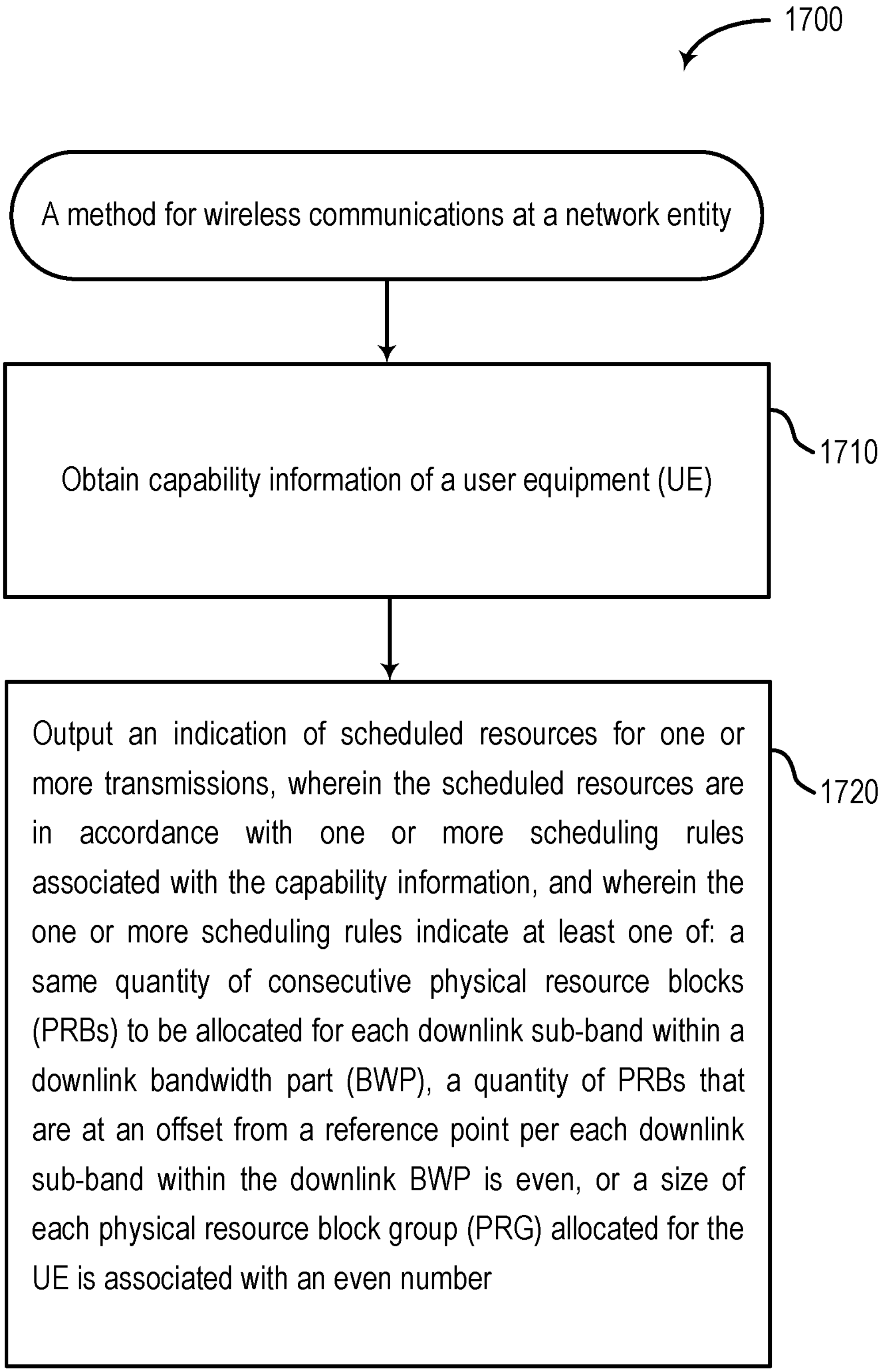
FIG. 17 depicts a method for wireless communications at a wireless node such as a network entity.

FIG. 17 shows an example of a method 1700 for wireless communications at a first wireless node. The first wireless node is a network entity, such as the BS 102 of FIG. 1 and FIG. 3. In some cases, the first wireless node may be a user equipment (UE), such as the UE 104 of FIG. 1 and FIG. 3.

Method 1700 begins at step 1710 with obtaining capability information of a UE. In some cases, the operations of this step refer to, or may be performed by, circuitry for obtaining and/or code for obtaining as described with reference to FIG. 19.

Method 1700 then proceeds to step 1720 with outputting an indication of scheduled resources for one or more transmissions. The scheduled resources are in accordance with one or more scheduling rules associated with the capability information, and the one or more scheduling rules indicate at least one of: a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, or a size of each physical resource block group (PRG) allocated for the UE is associated with an even number. In some cases, the operations of this step refer to, or may be performed by, circuitry for outputting and/or code for outputting as described with reference to FIG. 19.

In certain aspects, the capability information indicates at least one of: the UE is configured with a half duplex duplexing scheme; the UE is configured with a time resource associated with a sub-band full duplex (SBFD) duplexing scheme at the network entity; or the UE is configured with a frequency location associated with the SBFD duplexing scheme at the network entity.

In certain aspects, the capability information indicates that the UE supports scheduling of one or more partial PRGs per downlink sub-band within the downlink BWP for the UE, and one or more PRBs of a total number of PRBs in each partial PRG are used for the one or more transmissions.

In certain aspects, the capability information indicates at least one of: the UE supports scheduling of non-contiguous PRBs across two downlink sub-bands within the downlink BWP for the UE with contiguous PRBs in each downlink sub-band within the downlink BWP for the UE and one or more PRGs with a wideband precoding; or the UE does not support scheduling of resource elements (REs) that are not in multiples of an even number.

In certain aspects, the capability information indicates that the UE supports scheduling of resources with a wideband precoding.

In certain aspects, at least one scheduling rule indicates that a value of a PRB scheduling offset corresponding to the PRBs allocated in the each downlink sub-band within the downlink BWP for the UE does not have to be even.

In certain aspects, at least one scheduling rule indicates that a value of a PRB scheduling offset corresponding to the PRBs allocated in the each downlink sub-band within the downlink BWP for the UE has to be even.

Figure 19:
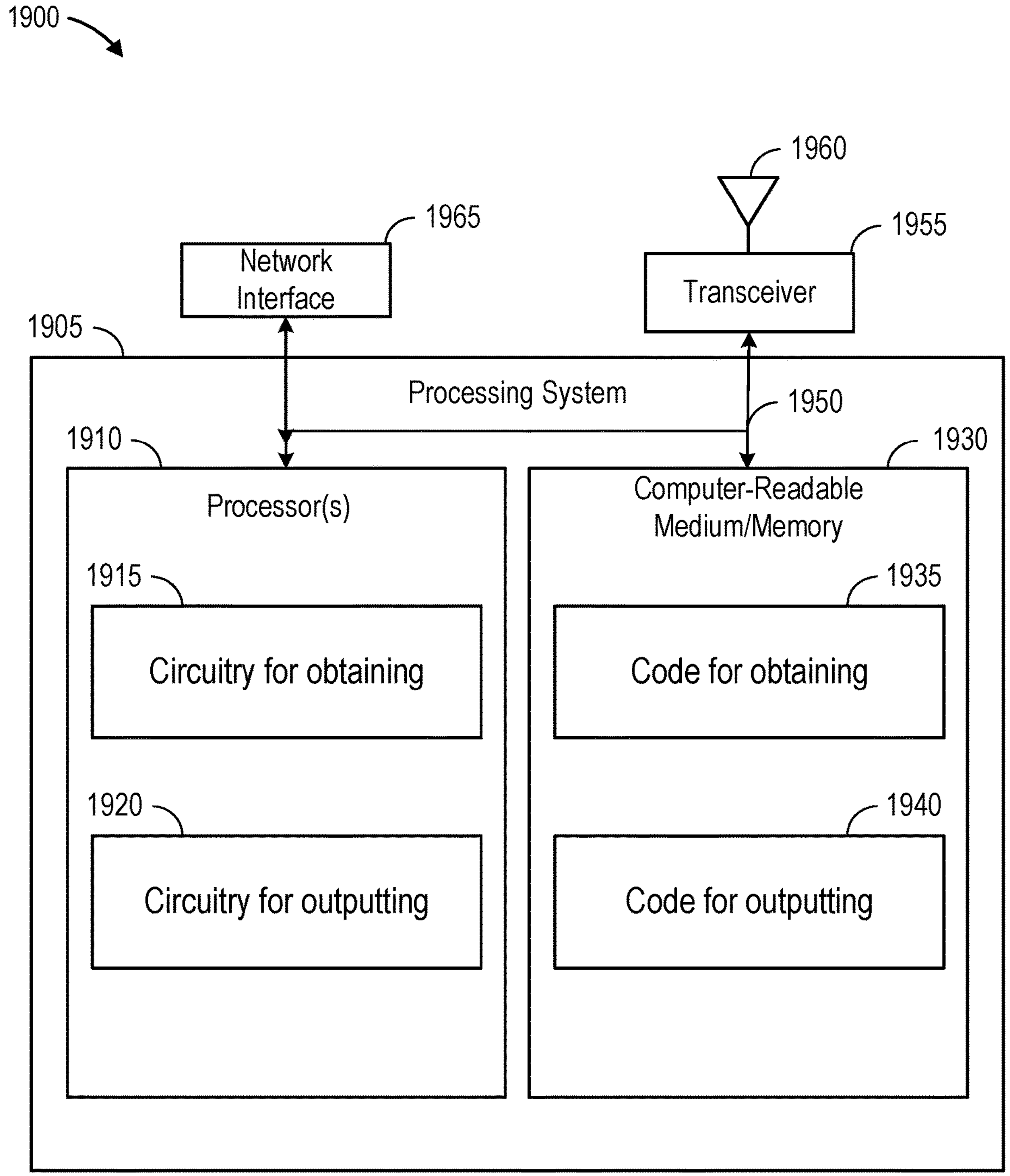

In one aspect, the method 1700, or any aspect related to it, may be performed by an apparatus, such as a communications device 1900 of FIG. 19, which includes various components operable, configured, or adapted to perform the method 1700. The communications device 1900 is described below in further detail.

Note that FIG. 19 is just one example of a method, and other methods including fewer, additional, or alternative steps are possible consistent with this disclosure.

Example Communications Devices

FIG. 18 depicts aspects of an example communications device 1800. In some aspects, communications device 1800 is a user equipment (UE), such as UE 104 described above with respect to FIG. 1 and FIG. 3.

The communications device 1800 includes a processing system 1805 coupled to a transceiver 1845 (e.g., a transmitter and/or a receiver). The transceiver 1845 is configured to transmit and receive signals for the communications device 1800 via an antenna 1850, such as the various signals as described herein. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of one or more of receive processor 358, transmit processor 364, TX MIMO processor 366, and/or controller/processor 380, as described with respect to FIG. 3. The one or more processors 1810 are coupled to a computer-readable medium/memory 1825 via a bus 1840. In certain aspects, the computer-readable medium/ memory 1825 is configured to store instructions (e.g., computer-executable code) that when executed by the one or more processors 1810, cause the one or more processors 1810 to perform the method 1600 described with respect to FIG. 16, and/or any aspect related to it. Note that reference to a processor performing a function of communications device 1800 may include the one or more processors 1810 performing that function of communications device 1800.

In the depicted example, computer-readable medium/memory 1825 stores code (e.g., executable instructions), such as code for outputting 1830 and code for obtaining 1835. Processing of the code for outputting 1830 and the code for obtaining 1835 may cause the communications device 1800 to perform the method 1600 described with respect to FIG. 16, and/or any aspect related to it.

The one or more processors 1810 include circuitry configured to implement (e.g., execute) the code stored in the computer-readable medium/memory 1825, including circuitry such as circuitry for outputting 1815 and circuitry for obtaining 1820. Processing with the circuitry for outputting 1815 and the circuitry for obtaining 1820 may cause the communications device 1800 to perform the method 1600 described with respect to FIG. 16, and/or any aspect related to it.

Various components of the communications device 1800 may provide means for performing the method 1600 described with respect to FIG. 16, and/or any aspect related to it. For example, means for transmitting, sending or outputting (e.g., for transmission) may include transceivers 354 and/or antenna(s) 352 of the UE 104 illustrated in FIG. 3 and/or the code for outputting 1830, the circuitry for outputting 1815, the transceiver 1845 and the antenna 1850 of the communications device 1800 in FIG. 18. Means for receiving or obtaining may include transceivers 354 and/or antenna(s) 352 of the UE 104 illustrated in FIG. 3 and/or the code for obtaining 1835, the circuitry for obtaining 1820, the transceiver 1845 and the antenna 1850 of the communications device 1800 in FIG. 18.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 18 is an example, and many other examples and configurations of communication device 1800 are possible.

FIG. 19 depicts aspects of an example communications device 1900. In some aspects, communications device 1900 is a network entity, such as BS 102 of FIG. 1 and FIG. 3, or a disaggregated base station as discussed with respect to FIG. 2.

The communications device 1900 includes a processing system 1905 coupled to a transceiver 1955 (e.g., a transmitter and/or a receiver) and/or a network interface 1965. The transceiver 1955 is configured to transmit and receive signals for the communications device 1900 via an antenna 1960, such as the various signals as described herein. The network interface 1965 is configured to obtain and send signals for the communications device 1900 via communication link(s), such as a backhaul link, midhaul link, and/or fronthaul link as described herein, such as with respect to FIG. 2. The processing system 1905 may be configured to perform processing functions for the communications device 1900, including processing signals received and/or to be transmitted by the communications device 1900.

The processing system 1905 includes one or more processors 1910. In various aspects, one or more processors 1910 may be representative of one or more of receive processor 338, transmit processor 320, TX MIMO processor 330, and/or controller/processor 340, as described with respect to FIG. 3. The one or more processors 1910 are coupled to a computer-readable medium/memory 1930 via a bus 1950. In certain aspects, the computer-readable medium/memory 1930 is configured to store instructions (e.g., computer-executable code) that when executed by the one or more processors 1910, cause the one or more processors 1910 to perform the method 1700 described with respect to FIG. 17, or any aspect related to it. Note that reference to a processor of communications device 1900 performing a function may include the one or more processors 1910 of communications device 1900 performing that function.

In the depicted example, the computer-readable medium/memory 1930 stores code (e.g., executable instructions), such as code for obtaining 1935 and code for outputting 1940. Processing of the code for obtaining 1935 and the code for outputting 1940 may cause the communications device 1900 to perform the method 1700 described with respect to FIG. 17, or any aspect related to it.

The one or more processors 1910 include circuitry configured to implement (e.g., execute) the code stored in the computer-readable medium/memory 1930, including circuitry such as circuitry for obtaining 1915 and circuitry for outputting 1920. Processing with the circuitry for obtaining 1915 and the circuitry for outputting 1920 may cause the communications device 1900 to perform the method 1700 described with respect to FIG. 17, or any aspect related to it.

Various components of the communications device 1900 may provide means for performing the method 1700 described with respect to FIG. 17, or any aspect related to it. Means for transmitting, sending or outputting for transmission may include transceivers 332 and/or antenna(s) 334 of the BS 102 illustrated in FIG. 3 and/or the circuitry for outputting 1920, the code for outputting 1940, the transceiver 1955 and the antenna 1960 of the communications device 1900 in FIG. 19. Means for receiving or obtaining may include transceivers 332 and/or antenna(s) 334 of the BS 102 illustrated in FIG. 3 and/or the circuitry for obtaining 1915, the code for obtaining 1935, the transceiver 1955 and the antenna 1960 of the communications device 1900 in FIG. 19.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 19 is an example, and many other examples and configurations of communication device 1900 are possible.

Example Clauses

Implementation examples are described in the following numbered clauses:

Clause 1: A method for wireless communications at a first wireless node, comprising: obtaining capability information of a second wireless node; and outputting an indication of scheduled resources for one or more transmissions, wherein the scheduled resources are in accordance with one or more scheduling rules associated with the capability information, and wherein the one or more scheduling rules indicate at least one of: a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, or a size of each physical resource block group (PRG) allocated for the second wireless node is associated with an even number.

Clause 2: The method of clause 1, wherein the capability information indicates at least one of: the second wireless node is configured with a half duplex duplexing scheme; the second wireless node is configured with a time resource associated with a sub-band full duplex (SBFD) duplexing scheme at the first wireless node; or the second wireless node is configured with a frequency location associated with the SBFD duplexing scheme at the first wireless node.

Clause 3: The method of any one of clauses 1-2, wherein the capability information indicates that the second wireless node supports scheduling of one or more partial PRGs per downlink sub-band within the downlink BWP for the second wireless node, and wherein one or more PRBs of a total number of PRBs in each partial PRG are used for the one or more transmissions.

Clause 4: The method of any one of clauses 1-3, wherein the capability information indicates at least one of: the second wireless node supports scheduling of non-contiguous PRBs across two downlink sub-bands within the downlink BWP for the second wireless node with contiguous PRBs in each downlink sub-band within the downlink BWP for the second wireless node and one or more PRGs with a wideband precoding; or the second wireless node does not support scheduling of resource elements (REs) that are not in multiples of an even number.

Clause 5: The method of any one of clauses 1-4, wherein the capability information indicates that the second wireless node supports scheduling of resources with a wideband precoding.

Clause 6: The method of clause 5, wherein at least one scheduling rule indicates that a value of a PRB scheduling offset corresponding to the PRBs allocated in the each downlink sub-band within the downlink BWP for the second wireless node does not have to be even.

Clause 7: The method of clause 5, wherein at least one scheduling rule indicates that a value of a PRB scheduling offset corresponding to the PRBs allocated in the each downlink sub-band within the downlink BWP for the second wireless node has to be even.

Clause 8: A method for wireless communications at a first wireless node, comprising: outputting capability information of the first wireless node; and obtaining an indication of scheduled resources for one or more transmissions, wherein the scheduled resources are in accordance with one or more scheduling rules associated with the capability information, and wherein the one or more scheduling rules indicate at least one of: a same quantity of consecutive physical resource blocks (PRBs) to be allocated for each downlink sub-band within a downlink bandwidth part (BWP), a quantity of PRBs that are at an offset from a reference point per each downlink sub-band within the downlink BWP is even, or a size of each physical resource block group (PRG) allocated for the first wireless node is associated with an even number.

Clause 9: The method of clause 8, wherein the capability information indicates at least one of: the first wireless node is configured with a half duplex duplexing scheme; the first wireless node is configured with a time resource associated with a sub-band full duplex (SBFD) duplexing scheme at a second wireless node; or the first wireless node is configured with a frequency location associated with the SBFD duplexing scheme at a second wireless node.

Clause 10: The method of any one of clauses 8-9, wherein the capability information indicates that the first wireless node supports scheduling of one or more partial PRGs per downlink sub-band within the downlink BWP for the first wireless node, and wherein one or more PRBs of a total number of PRBs in each partial PRG are used for the one or more transmissions.

Clause 11: The method of any one of clauses 8-10, wherein the capability information indicates at least one of: the first wireless node supports scheduling of non-contiguous PRBs across two downlink sub-bands within the downlink BWP for the first wireless node with contiguous PRBs in each downlink sub-band within the downlink BWP for the first wireless node and one or more PRGs with a wideband precoding; or the first wireless node does not support scheduling of resource elements (REs) that are not in multiples of an even number.

Clause 12: The method of any one of clauses 8-11, wherein the capability information indicates that the first wireless node supports scheduling of resources with a wideband precoding.

Clause 13: The method of clause 12, wherein at least one scheduling rule indicates that a value of a PRB scheduling offset corresponding to the PRBs allocated in the each downlink sub-band within the downlink BWP for the first wireless node does not have to be even.

Clause 14: The method of clause 12, wherein at least one scheduling rule indicates that a value of a PRB scheduling offset corresponding to the PRBs allocated in the each downlink sub-band within the downlink BWP for the first wireless node has to be even.

Clause 15: An apparatus, comprising: a memory comprising instructions; and one or more processors configured, individually or in any combination, to execute the instructions and cause the apparatus to perform a method in accordance with any one of Clauses 1-14.

Clause 16: An apparatus, comprising means for performing a method in accordance with any one of Clauses 1-14.

Clause 17: A non-transitory computer-readable medium comprising executable instructions that, when executed by one or more processors of an apparatus, cause the apparatus to perform a method in accordance with any one of Clauses 1-14.

Clause 18: A computer program product embodied on a computer-readable storage medium comprising code for performing a method in accordance with any one of Clauses 1-14.

Clause 19: A first wireless node, comprising: at least one transceiver; at least one memory comprising instructions; and one or more processors, individually or collectively, configured to execute the instructions and cause the first wireless node to perform a method in accordance with any one of clauses 1-7, wherein the at least one transceiver is configured to receive the capability information and transmit the indication of the scheduled resources, and wherein the first wireless node is a network entity or a user equipment (UE).

Clause 20: A first wireless node, comprising: at least one transceiver; at least one memory comprising instructions; and one or more processors, individually or collectively, configured to execute the instructions and cause the first wireless node to perform a method in accordance with any one of clauses 8-14, wherein the at least one transceiver is configured to transmit the capability information and receive the indication of the scheduled resources, and wherein the first wireless node is a user equipment (UE) or a network entity.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term wireless node may refer to, for example, a network entity or a UE. In this context, a network entity may be a base station (e.g., a gNB) or a module (e.g., a CU, DU, and/or RU) of a disaggregated base station.

While the present disclosure may describe certain operations as being performed by one type of wireless node, the same or similar operations may also be performed by another type of wireless node. For example, operations performed by a network entity may also (or instead) be performed by a UE. Similarly, operations performed by a UE may also (or instead) be performed by a network entity.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse order than described.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications, comprising:

at least one transceiver;

at least one memory comprising instructions; and one or more processors, individually or collectively, configured to execute the instructions to cause the apparatus to:

receive, via the at least one transceiver, capability information of a user equipment (UE); and transmit, via the at least one transceiver, an indication of scheduled resources for one or more transmissions, wherein the scheduled resources are in accordance with one or more scheduling rules associated with the capability information, and wherein the one or more scheduling rules indicate:

a same quantity of consecutive physical resource blocks (PRBs) to be allocated for each downlink sub-band within a downlink bandwidth part (BWP), and a quantity of PRBs that are at an offset from a reference point per each downlink sub-band within the downlink BWP is even, and a size of each physical resource block group (PRG) allocated for the UE is associated with an even number.

2. The apparatus of claim 1, wherein the capability information indicates at least one of:

the UE is configured with a half duplex duplexing scheme;

the UE is configured with a time resource associated with a sub-band full duplex (SBFD) duplexing scheme at the apparatus; or the UE is configured with a frequency location associated with the SBFD duplexing scheme at the apparatus.

3. The apparatus of claim 1, wherein the capability information indicates that the UE supports scheduling of one or more partial PRGs per downlink sub-band within the downlink BWP for the UE, and wherein one or more PRBs of a total number of PRBs in each partial PRG are used for the one or more transmissions.

4. The apparatus of claim 1, wherein the capability information indicates at least one of:

the UE supports scheduling of non-contiguous PRBs across two downlink sub-bands within the downlink BWP for the UE with contiguous PRBs in each downlink sub-band within the downlink BWP for the UE and one or more PRGs with a wideband precoding; or the UE does not support scheduling of resource elements (REs) that are not in multiples of an even number.

5. The apparatus of claim 1, wherein the capability information indicates that the UE supports scheduling of resources with a wideband precoding.

6. The apparatus of claim 5, wherein at least one scheduling rule indicates that a value of a PRB scheduling offset corresponding to the PRBs allocated in the each downlink sub-band within the downlink BWP for the UE does not have to be even.

7. The apparatus of claim 5, wherein at least one scheduling rule indicates that a value of a PRB scheduling offset corresponding to the PRBs allocated in the each downlink sub-band within the downlink BWP for the UE has to be even.

8. The apparatus of claim 1, wherein the apparatus is configured to operate as a network entity.

9. An apparatus for wireless communications, comprising:

at least one transceiver;

at least one memory comprising instructions; and one or more processors, individually or collectively, configured to execute the instructions and to cause the apparatus to:

transmit, via the at least one transceiver, capability information of the apparatus; and receive, via the at least one transceiver, an indication of scheduled resources for one or more transmissions, wherein the scheduled resources are in accordance with one or more scheduling rules associated with the capability information, and wherein the one or more scheduling rules indicate:

a same quantity of consecutive physical resource blocks (PRBs) to be allocated for each downlink sub-band within a downlink bandwidth part (BWP), and a quantity of PRBs that are at an offset from a reference point per each downlink sub-band within the downlink BWP is even, a size of each physical resource block group (PRG) allocated for the apparatus is associated with an even number.

10. The apparatus of claim 9, wherein the capability information indicates at least one of:

the apparatus is configured with a half duplex duplexing scheme;

the apparatus is configured with a time resource associated with a sub-band full duplex (SBFD) duplexing scheme at the apparatus; or the apparatus is configured with a frequency location associated with the SBFD duplexing scheme at the apparatus.

11. The apparatus of claim 9, wherein the capability information indicates that the apparatus supports scheduling of one or more partial PRGs per downlink sub-band within the downlink BWP for the apparatus, and wherein one or more PRBs of a total number of PRBs in each partial PRG are used for the one or more transmissions.

12. The apparatus of claim 9, wherein the capability information indicates at least one of:

the apparatus supports scheduling of non-contiguous PRBs across two downlink sub-bands within the downlink BWP for the apparatus with contiguous PRBs in each downlink sub-band within the downlink BWP for the apparatus and one or more PRGs with a wideband precoding; or the apparatus does not support scheduling of resource elements (REs) that are not in multiples of an even number.

13. The apparatus of claim 9, wherein the capability information indicates that the apparatus supports scheduling of resources with a wideband precoding.

14. The apparatus of claim 13, wherein at least one scheduling rule indicates that a value of a PRB scheduling offset corresponding to the PRBs allocated in the each downlink sub-band within the downlink BWP for the apparatus does not have to be even.

15. The apparatus of claim 13, wherein at least one scheduling rule indicates that a value of a PRB scheduling offset corresponding to the PRBs allocated in the each downlink sub-band within the downlink BWP for the apparatus has to be even.

16. The apparatus of claim 9, wherein the apparatus is configured to operate as a user equipment (UE).

17. A method for wireless communications by a first wireless node, comprising:

receiving capability information of a second wireless node; and transmitting an indication of scheduled resources for one or more transmissions, wherein the scheduled resources are in accordance with one or more scheduling rules associated with the capability information, and wherein the one or more scheduling rules indicate a same quantity of consecutive physical resource blocks (PRBs) to be allocated for each downlink sub-band within a downlink bandwidth part (BWP), and a quantity of PRBs that are at an offset from a reference point per each downlink sub-band within the downlink BWP is even, and a size of each physical resource block group (PRG) allocated for the second wireless node is associated with an even number.

18. The method of claim 17, wherein the capability information indicates at least one of:

the second wireless node is configured with a half duplex duplexing scheme;

the second wireless node is configured with a time resource associated with a sub-band full duplex (SBFD) duplexing scheme at the first wireless node; or the second wireless node is configured with a frequency location associated with the SBFD duplexing scheme at the first wireless node.

19. The method of claim 17, wherein the capability information indicates that the second wireless node supports scheduling of one or more partial PRGs per downlink sub-band within the downlink BWP for the second wireless node, and wherein one or more PRBs of a total number of PRBs in each partial PRG are used for the one or more transmissions.

20. The method of claim 17, wherein the capability information indicates at least one of:

the second wireless node supports scheduling of non-contiguous PRBs across two downlink sub-bands within the downlink BWP for the second wireless node with contiguous PRBs in each downlink sub-band within the downlink BWP for the second wireless node and one or more PRGs with a wideband precoding; or the second wireless node does not support scheduling of resource elements (REs) that are not in multiples of an even number.

* * * * *